US011868746B2

(12) United States Patent
Creanga et al.

(10) Patent No.: US 11,868,746 B2
(45) Date of Patent: Jan. 9, 2024

(54) SYSTEM AND METHOD FOR TRANSITION OF STATIC SCHEMA TO DYNAMIC SCHEMA

(71) Applicant: Kinaxis Inc., Ottawa (CA)

(72) Inventors: Marin Creanga, Ottawa (CA); Dylan Ellicott, Ottawa (CA); Robert Walker, Ottawa (CA)

(73) Assignee: Kinaxis Inc., Ottawa (CA)

( * ) Notice: Subject to any disclaimer, the term of this patent is extended or adjusted under 35 U.S.C. 154(b) by 0 days.

(21) Appl. No.: 17/901,273

(22) Filed: Sep. 1, 2022

(65) Prior Publication Data

US 2023/0075578 A1 Mar. 9, 2023

Related U.S. Application Data

(60) Provisional application No. 63/240,056, filed on Sep. 2, 2021.

(51) Int. Cl.
*G06F 9/44* (2018.01)
*G06F 8/41* (2018.01)

(52) U.S. Cl.
CPC ................. *G06F 8/4434* (2013.01)

(58) Field of Classification Search
CPC .................................................. G06F 8/4434
USPC ......................................................... 717/152
See application file for complete search history.

(56) References Cited

U.S. PATENT DOCUMENTS

| 6,944,626 | B2* | 9/2005 | Cameron | ................. G06F 16/81 707/804 |
| 7,139,746 | B2 | 11/2006 | Shin et al. | |
| 7,536,414 | B2* | 5/2009 | Cameron | ................. G06F 16/81 |
| 7,747,986 | B2* | 6/2010 | LaVigne | ................. G06Q 10/10 717/131 |
| 7,831,633 | B1 | 11/2010 | Chan et al. | |
| 9,756,001 | B2* | 9/2017 | Singh | ................. H04L 51/046 |
| 9,817,877 | B2* | 11/2017 | Taranov | ................. G06F 16/258 |
| 10,581,932 | B2* | 3/2020 | Addepalli | ........... H04L 65/1073 |
| 10,635,666 | B2 | 4/2020 | Rastogi et al. | |

(Continued)

FOREIGN PATENT DOCUMENTS

| EP | 1615127 A1 | 1/2006 |
| EP | 2355023 A1 | 8/2011 |

OTHER PUBLICATIONS

Pinto et al., "DAOP-ADL: An Architecture DescriptionLanguage for Dynamic Component and Aspect-Based Development", 2003, Springer-Verlag , pp. 118-137. (Year: 2003).*

(Continued)

*Primary Examiner* — Ted T. Vo

(74) *Attorney, Agent, or Firm* — Borden Ladner Gervais LLP; Curtis B. Behmann

(57) ABSTRACT

Systems and methods that provide a mechanism to transition static schema to dynamic schema while maintaining backwards capability. Simple removal of static schema elements, followed by replacement with dynamic schema elements, make a third-party code incompatible since the third-party code references schema entities that no longer exist. Provided is a mechanism to decrease the memory use of non-material static schema entities. Transitioning static schema to dynamic schema allows the database to avoid loading non-material schema entities, thereby decreasing overall memory usage.

21 Claims, 16 Drawing Sheets

(56) References Cited

U.S. PATENT DOCUMENTS

2005/0188334 A1 8/2005 Shah et al.
2016/0004754 A1 1/2016 Zoheir et al.

OTHER PUBLICATIONS

Sumathi, "Objected-Oriented and Object Relational DBMS", 2007, Springer-Verlag, pp. 477-558. (Year: 2007).*

* cited by examiner

```
<schema>
    <table>Name = "Part">
        <field> Name = "PartName" Type = "string"</field>
        <field> Name = "PartQuantity" Type = "numeric"</field>
        <field> Name = "PartStock" Type = "numeric"</field>
        <field> Name = "ShelfLife" Type = "numeric"</field>
        <field> Name = "PartSource" Type = "numeric"</field>
    </table>
</schema>
```

FIG. 2

| FIELD TYPE | NUMBER OF GET CALLS | GET TYPE | EXECUTION |
|---|---|---|---|
| HIGH PERFORMANCE FIELD 602 | 0 | Get Data Record at Offset | Get Data Record at Offset |
| REGULAR PERFORMANCE FIELD 604 | 1+ | Get Offset<br>Get Data Record at Offset | 1. Get Offset<br>2. Get Data Record at Offset |
| DROPPED FIELD 606 | 1+ | Get Offset<br>Get Data Record at Offset | 1. Get Offset<br>2. Get Value Outside of Record |

FIG. 6

SYSTEM AND METHOD FOR TRANSITION OF STATIC SCHEMA TO DYNAMIC SCHEMA

CROSS-REFERENCE TO RELATED APPLICATIONS

This application claims priority to U.S. Ser. No. 63/240,056 filed Sep. 2, 2021, which is hereby incorporated by reference.

BACKGROUND

Databases can have both static and dynamic schemas. Static schemas are compile-time schemas that are always available and cannot be added, removed or modified after compile time. On the other hand, dynamic schemas are schema entities that can be added, removed, or modified at run time. It follows that record layouts of static schema entities are fixed at compile time, while the record layout of dynamic schema entries are changeable at run time.

Static schema can be generated based on any format—for example: JavaScript Object Notation (JSON), Extensible Markup Language (XML), Binary, etc. While this provides good performance, there is a drawback in that a memory cost is paid for all field data—including field data that is unused by a third-party code. When memory used by static schema entities are substantial in size, the server uses significant memory to materialize all records in memory.

A third-party code can access both static and dynamic schema entries. Accessing static schema entities allows for high performance. Static schema entities that are accessed by a third-party code cannot be removed without making the third-party code incompatible. The third-party code fails to compile if static schema entries are removed. Accessing dynamic schema entities allows for regular performance. On the other hand, dynamic schema entities that are accessed by third-party code, can be removed while still maintaining third party code compatibility. The third-party code can compile successfully.

BRIEF SUMMARY

The systems and methods disclosed herein provide a mechanism to transition static schema to dynamic schema while maintaining backwards capability. Simple removal of static schema elements, followed by replacement with dynamic schema elements, make a third-party code incompatible since the third-party code references schema entities that no longer exist.

The systems and methods disclosed herein provide a mechanism to decrease the memory use of non-material static schema entities. Transitioning static schema to dynamic schema allows the database to avoid loading non-material schema entities, thereby decreasing overall memory usage.

The systems and methods disclosed herein save memory in a database by not loading unused fields. Various systems, such as a database, load data at various points at runtime. For example, a database can load all the data on startup, or on demand, or partially at startup and the rest on demand. When the loading takes places, at any point during runtime, the systems and methods disclosed herein save memory by not loading fields that are unused.

Static schema layout is generated for some fields, while a dynamic schema is generated for other fields. This allows the dataserver to avoid loading unused field data, and thus save memory in the database.

Both the static schema layout and dynamic schema layout are generated with a software development kit (SDK) and with a static schema and a dynamic schema, all of which are considered to be generated at compile time. While the dynamic schema layout allows for resolving of records at runtime, the decision of whether an entity is static or dynamic, is completed at compile time. An entity can include, for example, a field.

The SDK can include libraries that are used by a third-party to write its code. The SDK can also include functionality to generate libraries to be used by the third-party to write its code. Technically, the SDK is generated by a process; the SDK is generated either before, or during, compilation of the third-party code. As such, SDK generation is considered as part of compile time. Run time is considered to occur when the third-party is running its code.

In one aspect, a computer-implemented method includes executing, by a processor, a first process in parallel with a second process. The first process includes generating, by the processor, a first schema having one or more dropped fields. The second process includes: generating, by the processor, a software development kit (SDK) that supports the one or more dropped fields; generating, by the processor, a second schema having one or more undropped fields; and compiling, by the processor, a third-party code. After executing both the first process and the second process, the method includes running, by the processor, the third-party code; initializing, by the processor, a record layout; and accessing, by the processor, one or more high performance fields, one or more regular performance fields, and the one or more dropped fields.

When generating the SDK, the computer-implemented method may also include processing, by the processor, one or more tables, processing the one or more tables comprising: selecting, by the processor, a table from the one or more tables; generating, by the processor, a code representing the table as one or more functions, methods and/or objects, with one or more getters for each field in the table; processing, by the processor, each field in the table, processing each field comprising: assigning, by the processor, a high-performance field getter with a static compile time offset, for a high-performance field; and assigning, by the processor, a regular-performance field getter and/or a dropped field getter with a call to retrieve a runtime offset for a regular-performance field; and after processing the one or more tables: packaging, by the processor, one or more libraries.

When initializing the record layout, the computer-implemented method may include: processing, by the processor, one or more tables, processing the one or more tables comprising: selecting, by the processor, a table from the one or more tables; processing, by the processor, each field in the table, processing each field comprising: allocating, by the processor, a space at an end of the record layout for each field that is not droppable; and after processing the one or more tables: completing, by the processor, the record layout.

When accessing a high performance field, the computer-implemented method may include: calling, by the processor, a getter of the high performance field; accessing, by the processor, data associated with the high performance field by using a static compile time offset; retrieving, by the processor, a value of the high performance field through a direct memory access using the static compile time offset; and returning, by the processor, the value of the high-performance field to a caller that called the getter of the high-performance field.

When accessing a regular performance field comprises, the computer-implemented may include: calling, by the processor, a getter of data associated with the regular performance field; interrogating, by the processor, a data server for an offset of the regular performance field; accessing, by the processor, the data by using the offset; and returning, by the processor, the data to a caller that called the getter.

When accessing a dropped field, the computer-implemented may include: calling, by the processor, a getter of data associated with a field that is not a high-performance field; interrogating, by the processor, a data server for an offset of the field; determining, by the processor, that the offset is invalid, thereby indicating that the field is the dropped field; obtaining, by the processor, data for the dropped field suitable for use by the third-party code, without recourse to a record; and returning, by the processor, the data suitable for use by the third-party code, to a caller that called the getter. The data for the dropped field suitable for use by the third-party code can be a default value. Other technical features may be readily apparent to one skilled in the art from the following figures, descriptions, and claims.

In another aspect, a computing apparatus includes a processor. The computing apparatus also includes a memory storing instructions that, when executed by the processor, configure the apparatus to execute, by the processor, a first process in parallel with a second process. With regards to the first process, the apparatus is configured to generate, by the processor, a first schema having one or more dropped fields. With regards to the second process, the apparatus is configured to: generate, by the processor, a software development kit (SDK) that supports the one or more dropped fields; generate, by the processor, a second schema having one or more undropped fields; and compile, by the processor, a third-party code. After executing both the first process and the second process, the apparatus is configured to: run, by the processor, the third-party code; initialize, by the processor, a record layout; and access, by the processor, one or more high performance fields, one or more regular performance fields, and the one or more dropped fields.

When generating the SDK, the apparatus can be configured to: process, by the processor, one or more tables; select, by the processor, a table from the one or more tables; generate, by the processor, a code representing the table as one or more functions, methods and/or objects, with one or more getters for each field in the table; process, by the processor, each field in the table; assign, by the processor, a high-performance field getter with a static compile time offset, for a high-performance field; and assign, by the processor, a regular-performance field getter and/or a dropped field getter with a call to retrieve a runtime offset for a regular-performance field. The computing apparatus may also be configured to, after processing each field and the one or more tables, package, by the processor, one or more libraries.

When initializing the record layout, the apparatus can be configured to process, by the processor, one or more tables. The computing apparatus may also include select, by the processor, a table from the one or more tables; process, by the processor, each field in the table; allocate, by the processor, a space at an end of the record layout for each field that is not droppable; and after processing each field and the one or more tables, complete, by the processor, the record layout.

When accessing a high performance field, the apparatus can be configured to call, by the processor, a getter of the high performance field; access, by the processor, data associated with the high performance field by using a static compile time offset; retrieve, by the processor, a value of the high performance field through a direct memory access using the static compile time offset; and return, by the processor, the value of the high-performance field to a caller that called the getter When accessing a regular performance field, the apparatus can be configured to call, by the processor, a getter of data associated with the regular performance field; interrogate, by the processor, a data server for an offset of the regular performance field; access, by the processor, the data by using the offset; and return, by the processor, the data to a caller that called the getter.

When accessing a dropped field, the apparatus can be configured to call, by the processor, a getter of data associated with a field that is not a high-performance field; interrogate, by the processor, a data server for an offset of the field; determine, by the processor, that the offset is invalid, thereby indicating that the field is a dropped field; obtain, by the processor, data for the dropped field suitable for use by the third-party code, without recourse to a record; and return, by the processor, the data suitable for use by the third-party code, to a caller that called the getter. Data for the dropped field suitable for use by the third-party code can be a default value. Other technical features may be readily apparent to one skilled in the art from the following figures, descriptions, and claims.

In another aspect, a non-transitory computer-readable storage medium, the computer-readable storage medium including instructions that when executed by a computer, cause the computer to execute, by the processor, a first process in parallel with a second process. With regards to the first process, the instructions that when executed by the computer, cause the computer to generate, by the processor, a first schema having one or more dropped fields. With regards to the second process, the instructions that when executed by the computer, cause the computer to: generate, by the processor, a software development kit (SDK) that supports the one or more dropped fields; generate, by the processor, a second schema having one or more undropped field; and compile, by the processor, a third-party code. After executing both the first process and second process, the instructions that when executed by the computer, cause the computer to: run, by the processor, the third-party code; initialize, by the processor, a record layout, and access, by the processor, one or more high performance fields, one or more regular performance fields, and the one or more dropped fields.

When generating the SDK, the instructions that when executed by the computer, can cause the computer to: process, by the processor, one or more tables; select, by the processor, a table from the one or more tables; generate, by the processor, a code representing the table as one or more functions, methods and/or objects, with one or more getters for each field in the table; process, by the processor, each field in the table; assign, by the processor, a high-performance field getter with a static compile time offset, for a high-performance field; and assign, by the processor, a regular-performance field getter and/or a dropped field getter with a call to retrieve a runtime offset for a regular-performance field. The computing apparatus may also be configured to, after processing each field and the one or more tables, package, by the processor, one or more libraries.

When initializing the record layout, the instructions that when executed by the computer, can cause the computer to: process, by the processor, one or more tables; select, by the processor, a table from the one or more tables; process, by the processor, each field in the table; allocate, by the processor, a space at an end of the record layout for each field that is not droppable; and after processing each field and the one or more tables, complete, by the processor, the record layout.

When accessing a high performance field, the instructions that when executed by the computer, can cause the computer to: call, by the processor, a getter of the high performance field; access, by the processor, data associated with the high performance field by using a static compile time offset; retrieve, by the processor, a value of the high performance field through a direct memory access using the static compile time offset; and return, by the processor, the value of the high-performance field to a caller that called the getter When accessing a regular performance field, the instructions that when executed by the computer, can cause the computer to: call, by the processor, a getter of data associated with the regular performance field; interrogate, by the processor, a data server for an offset of the regular performance field; access, by the processor, the data by using the offset; and return, by the processor, the data to a caller that called the getter.

When accessing a dropped field, the instructions that when executed by the computer, can cause the computer to: call, by the processor, a getter of data associated with a field that is not a high-performance field; interrogate, by the processor, a data server for an offset of the field; determine, by the processor, that the offset is invalid, thereby indicating that the field is a dropped field; obtain, by the processor, data for the dropped field suitable for use by the third-party code, without recourse to a record; and return, by the processor, the data suitable for use by the third-party code, to a caller that called the getter. Data for the dropped field suitable for use by the third-party code can be a default value. Other technical features may be readily apparent to one skilled in the art from the following figures, descriptions, and claims.

The details of one or more embodiments of the subject matter of this specification are set forth in the accompanying drawings and the description below. Other features, aspects, and advantages of the subject matter will become apparent from the description, the drawings, and the claims.

Other technical features may be readily apparent to one skilled in the art from the following figures, descriptions, and claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 2 illustrates an example schema as XML in accordance with one embodiment.

FIG. 6 illustrates field types in accordance with one embodiment.

DETAILED DESCRIPTION

Figure 1:
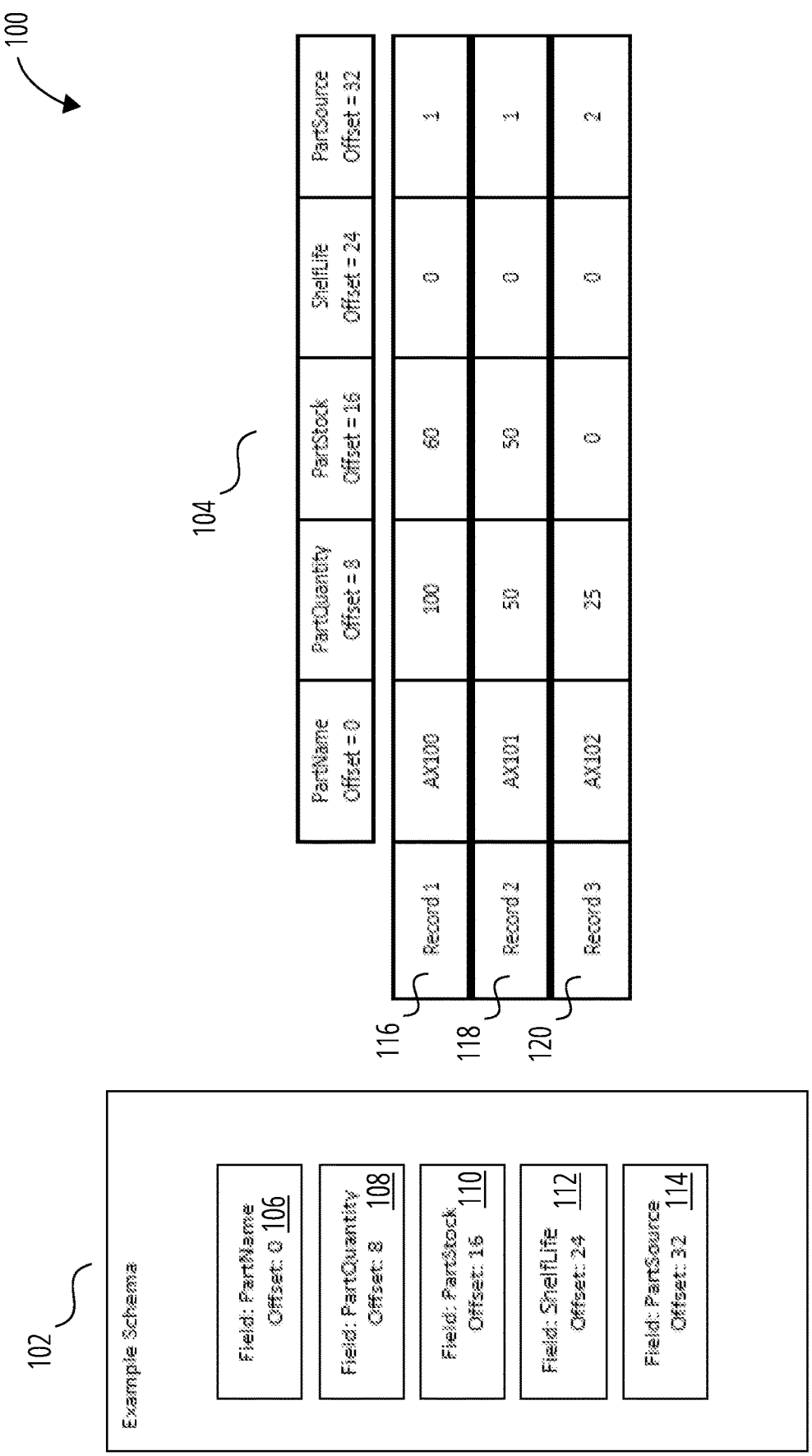
FIG. 1 illustrates an example schema layout and an example in-memory record layout.

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage media having computer readable program code embodied thereon.

Many of the functional units described in this specification have been labeled as modules, in order to emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable storage media.

Any combination of one or more computer readable storage media may be utilized. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a Blu-ray disc, an optical storage device, a magnetic tape, a Bernoulli drive, a magnetic disk, a magnetic storage device, a punch card, integrated circuits, other digital processing apparatus memory devices, or any suitable combination of the foregoing, but would not include propagating signals. In the context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java, Python, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the disclosure may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosure. However, the disclosure may be practiced without one or more of the specific details, or with other methods, components, materials, and so forth. In other instances, well-known structures, materials, or operations are not shown or described in detail to avoid obscuring aspects of the disclosure.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the schematic flowchart diagrams and/or schematic block diagrams block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

The description of elements in each figure may refer to elements of proceeding figures. Like numbers refer to like elements in all figures, including alternate embodiments of like elements.

A computer program (which may also be referred to or described as a software application, code, a program, a script, software, a module or a software module) can be written in any form of programming language. This includes compiled or interpreted languages, or declarative or procedural languages. A computer program can be deployed in many forms, including as a module, a subroutine, a stand-alone program, a component, or other unit suitable for use in a computing environment. A computer program can be deployed to be executed on one computer or can be deployed on multiple computers that are located at one site or distributed across multiple sites and interconnected by a communication network.

As used herein, a "software engine" or an "engine," refers to a software implemented system that provides an output that is different from the input. An engine can be an encoded block of functionality, such as a platform, a library, an object or a software development kit ("SDK"). Each engine can be implemented on any type of computing device that includes one or more processors and computer readable media. Furthermore, two or more of the engines may be implemented on the same computing device, or on different computing devices. Non-limiting examples of a computing device include tablet computers, servers, laptop or desktop computers, music players, mobile phones, e-book readers, notebook computers, PDAs, smart phones, or other stationary or portable devices.

The processes and logic flows described herein can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows that can be performed by an apparatus, can also be implemented as a graphics processing unit (GPU).

Computers suitable for the execution of a computer program include, by way of example, general or special purpose microprocessors or both, or any other kind of central processing unit. Generally, a central processing unit receives instructions and data from a read-only memory or a random access memory or both. A computer can also include, or be operatively coupled to receive data from, or transfer data to, or both, one or more mass storage devices for storing data, e.g., optical disks, magnetic, or magneto optical disks. It should be noted that a computer does not require these devices. Furthermore, a computer can be embedded in another device. Non-limiting examples of the latter include a game console, a mobile telephone a mobile audio player, a personal digital assistant (PDA), a video player, a Global Positioning System (GPS) receiver, or a portable storage device. A non-limiting example of a storage device include a universal serial bus (USB) flash drive.

Computer readable media suitable for storing computer program instructions and data include all forms of non-volatile memory, media and memory devices; non-limiting examples include magneto optical disks; semiconductor memory devices (e.g., EPROM, EEPROM, and flash memory devices); CD ROM disks; magnetic disks (e.g., internal hard disks or removable disks); and DVD-ROM disks. The processor and the memory can be supplemented by, or incorporated in, special purpose logic circuitry.

To provide for interaction with a user, embodiments of the subject matter described herein can be implemented on a computer having a display device for displaying information to the user and input devices by which the user can provide input to the computer (for example, a keyboard, a pointing device such as a mouse or a trackball, etc.). Other kinds of devices can be used to provide for interaction with a user. Feedback provided to the user can include sensory feedback (e.g., visual feedback, auditory feedback, or tactile feedback). Input from the user can be received in any form, including acoustic, speech, or tactile input. Furthermore, there can be interaction between a user and a computer by way of exchange of documents between the computer and a device used by the user. As an example, a computer can send web pages to a web browser on a user's client device in response to requests received from the web browser.

Embodiments of the subject matter described in this specification can be implemented in a computing system that includes: a front end component (e.g., a client computer having a graphical user interface or a Web browser through which a user can interact with an implementation of the subject matter described herein); or a middleware component (e.g., an application server); or a back end component (e.g. a data server); or any combination of one or more such back end, middleware, or front end components. The components of the system can be interconnected by any form or medium of digital data communication, e.g., a communication network. Non-limiting examples of communication networks include a local area network ("LAN") and a wide area network ("WAN").

The computing system can include clients and servers. A client and server are generally remote from each other and typically interact through a communication network. The relationship of client and server arises by virtue of computer programs running on the respective computers and having a client-server relationship to each other.

FIG. 1 illustrates an example schema layout 102 and an example in-memory record layout 104 of three records from the example schema layout 102. In FIG. 1, example schema layout 102 is a static schema layout.

The example schema layout 102 includes five fields, as follows: Part Name 106, with an offset of 0; field: Part Quantity 108 with an offset of 8; Part Stock 110, with an offset of 16; Shelf Life 112 with an offset of 24; and Part Source 114, with an offset of 32. Note that while five fields are illustrated, there can be fewer or greater than five.

Each field is also associated with an offset, which indicates a distance between the beginning of an array of fields and a given field. In this embodiment, the offset is in units of bytes, although technically, the offset can be any type of unit. For example, the field Part Name 106 is at the beginning of the array—it has an offset of 0. Next is the filed Part Quantity 108, which is offset by 8 bytes from the beginning of the array of fields. This is followed by Part Stock 110, which is offset by 16 bytes from the beginning of the array of fields. Next, Shelf Life 112 is offset by 24 bytes from the beginning of the array of fields. Finally, Part Source 114, is offset by 32 bytes from the beginning of the array of fields.

The in-memory record layout 104 includes three records, as follows: Record 1 116 has a Part Name of "AX100", a Part Quantity of "100", a Part Stock of "60", Shelf Life of "0", and a Part Source of "1"; Record 2 118 has a Part Name of "AX101", a Part Quantity of "50", a Part Stock of "50", Shelf Life of "0", and a Part Source of "1"; and Record 3 120 has a Part Name of "AX102", a Part Quantity of "25", a Part Stock of "0", Shelf Life of "0", and a Part Source of "2". Note that while three records are illustrated, there can be fewer or greater than three.

In the layout 104, each field is filled with a value, and takes up space in memory. Each record has five fields, with each field having a value. In some embodiments, a field can have a default value that is unchanged since a user has no need to change the default. For example, in FIG. 1, the default value of the field Shelf Life is '0'. A user can leave the default value of Shelf Life for each record, if the shelf life of a part is irrelevant to the part. As an example, if the part is an element that does not expire, such as a screw, a user can leave the Shelf Life field at its default value.

FIG. 2 illustrates an example schema 200 as XML in accordance with one embodiment. FIG. 2, which illustrates a schema (as XML), is distinct from FIG. 1 which is a schema layout. In general, the schema can be in any suitable format.

Figure 3:
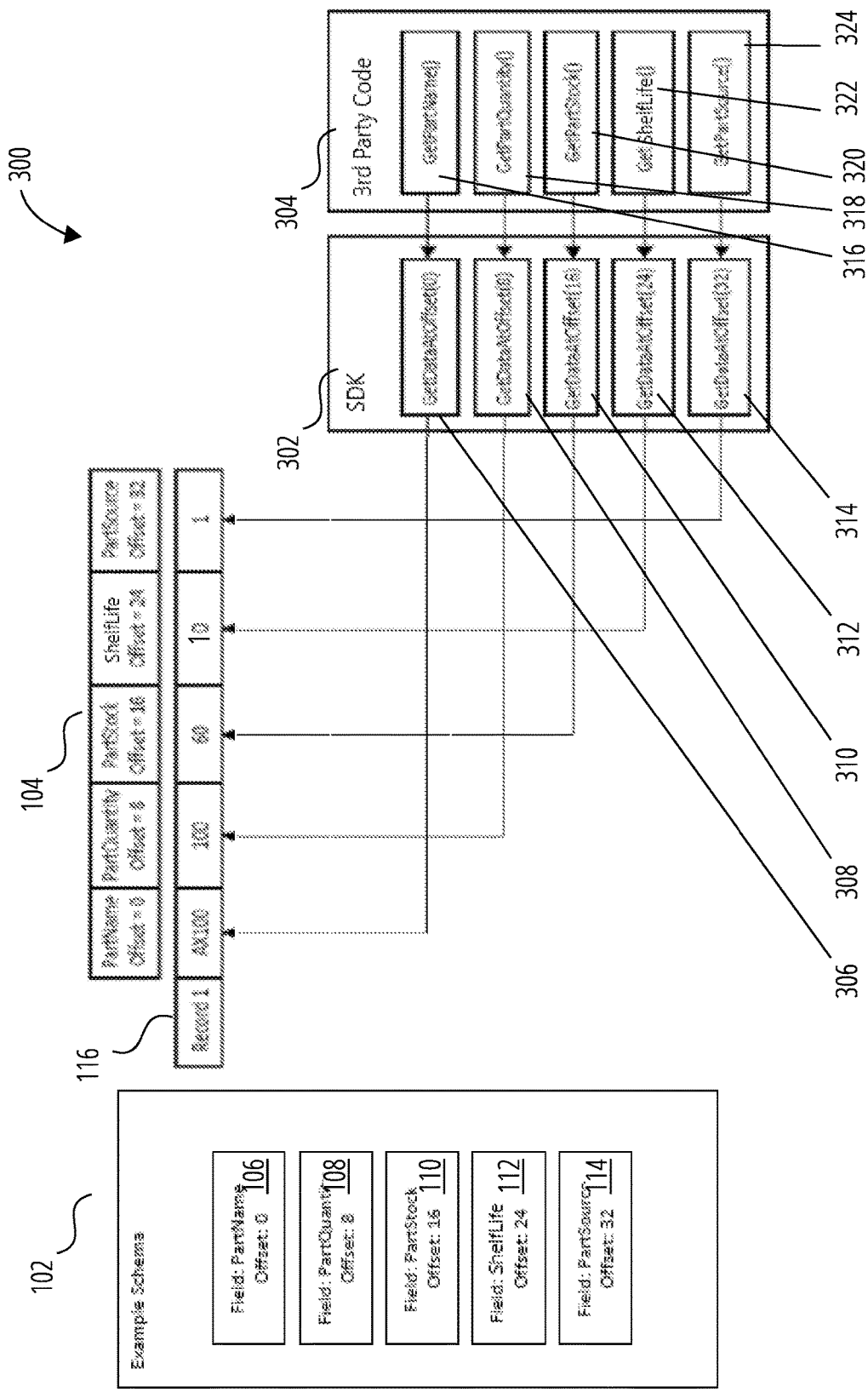
FIG. 3 illustrates a resolution of fields in Record 1 of the example shown in FIG. 1.

FIG. 3 illustrates a resolution of fields 300 in Record 1 116 of the example shown in FIG. 1. A code 302 generated by an SDK, is used by a Third-Party Code 304, to access data associated with Record 1 116. In FIG. 3, the Third-Party Code 304 accesses the field values of Record 1 116, without accessing the example schema layout 102.

In the embodiment shown in FIG. 3, resolution refers to querying a repository of information, in which the repository contains a record, and the generated code 302 is performing the query on behalf of the Third-Party Code 304. In FIG. 3, the process of resolution is as follows. The code to get the Part Name 316, is associated with the generated code 302 to get data at Offset (0) (306), which has a value of "AX100". The code for obtaining the Part Quantity (318), is associated with the generated code 302 to get data at Offset (8) (308), which has a value of "100". The code for obtaining the Part Quantity (318), is associated with the generated code 302 to get data at Offset (8) (308), which is "100". The code for obtaining the Part Stock (320), is associated with the generated code 302 to get data at Offset (16) (310), which has a value of "60". The code for obtaining the Shelf Life (322), is associated with the SDK tool to get data at Offset (24) (308), which has a value of "0". Finally, the code for obtaining the Part Source (324), is associated with the generated code 302 to get data at Offset (32) (212), which has a value of "1".

Figure 4:
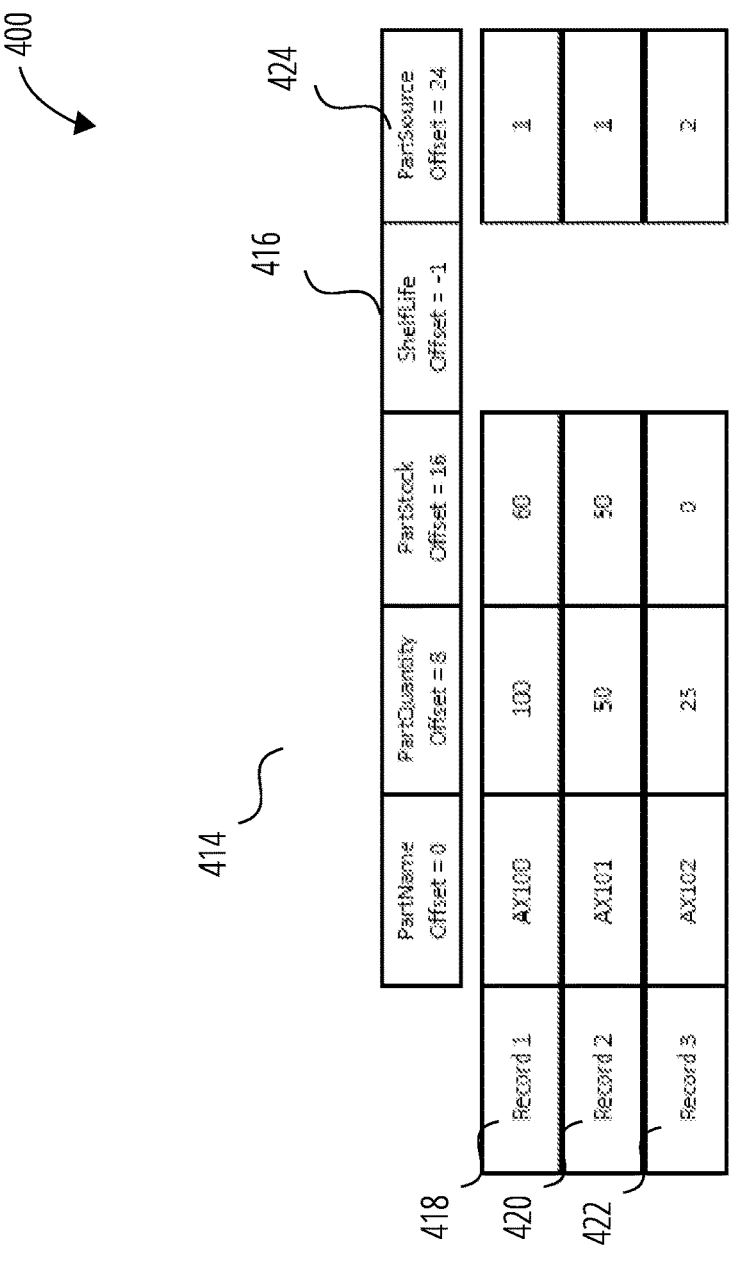
FIG. 4 illustrates an example schema layout and an example in-memory record layout records in accordance with one embodiment.

FIG. 4 illustrates an example schema layout and a record layout example with dropped fields, in accordance with one embodiment.

An example schema layout 402 includes five fields, as follows: Part Name 404, with an offset of 0; Part Quantity 406, with an offset of 8; PartStock 408, with an offset of 16; Shelf Life 410 with an offset of −1; and PartSource 412, with an offset of 24. In addition to an offset, each field is now also classified with a type: PartName 404 is a high performance field; Part Quantity 406 is a high performance field; PartStock 408 is a regular performance field; ShelfLife 410 is a dropped field; and PartSource 412 is a regular performance field. Field types are further discussed in FIG. 6. Note that while five fields are illustrated, there can be fewer or greater than five, as long as there is at least one field with an invalid offset.

The in-memory record layout 414 includes three records, as follows: Record 1 418 has a Part Name of "AX100", a Part Quantity of "100", a Part Stock of "60", and a Part Source of "1"; Record 2 420 has a Part Name of "AX101", a Part Quantity of "50", a Part Stock of "50", and a Part Source of "1"; and Record 3 422 has a Part Name of "AX102", a Part Quantity of "25", a Part Stock of "0", and a Part Source of "2". The ShelfLife offset 416, set to −1, means that there is no entry for Shelf Life in either Record 1, Record 2 or Record 3. Note that while three records are illustrated, there can be fewer or greater than three.

The records shown in FIG. 4 now have a value for each of the fields Part Name, Part Quantity, Part Stock and Part Source; these records do not have a value for the field Shelf Life.—For example, each record in FIG. 4 can refer to a screw, for which a shelf life is not required. This is in contrast to a situation in which specification of a shelf life is material. For example, where each part refers to a pharmaceutical ingredient, for which a shelf life is material.

The field Shelf Life, is thus termed as "dropped" in FIG. 4. That is, "dropping" a field is defined as not allocating memory for that field since an industry/customer will not need to use that field. Furthermore, it is given an invalid offset value, for example, a value of '−1', as shown in FIG. 4. Since the records in FIG. 4 have no Shelf Life value, the PartSource field is moved after the PartStock field; the PartSource offset 424 is now set to 24. This is also reflected in the example schema layout 402, in box 410 and box 412. In FIG. 4, the field "Shelf Life" can still be used by the third-party code, although for the particular application/customer, the "Shelf Life" is not material Since the Shelf Life field is dropped and no longer stored in memory, the size of each in-memory record is reduced. In this way, memory can be reduced proportional to the size of Shelf Life and the number of records in the table. In FIG. 4, each record is reduced from 40 bytes (that is, five fields at 8 bytes per field) to 32 bytes (that is, four fields at 8 bytes per field). In total, 24 bytes have been saved (8 bytes per record and there are 3 records). In general, by dropping at least one of its fields, a record is reduced in size; for a layout, the list of records is reduced in size.

Figure 5:
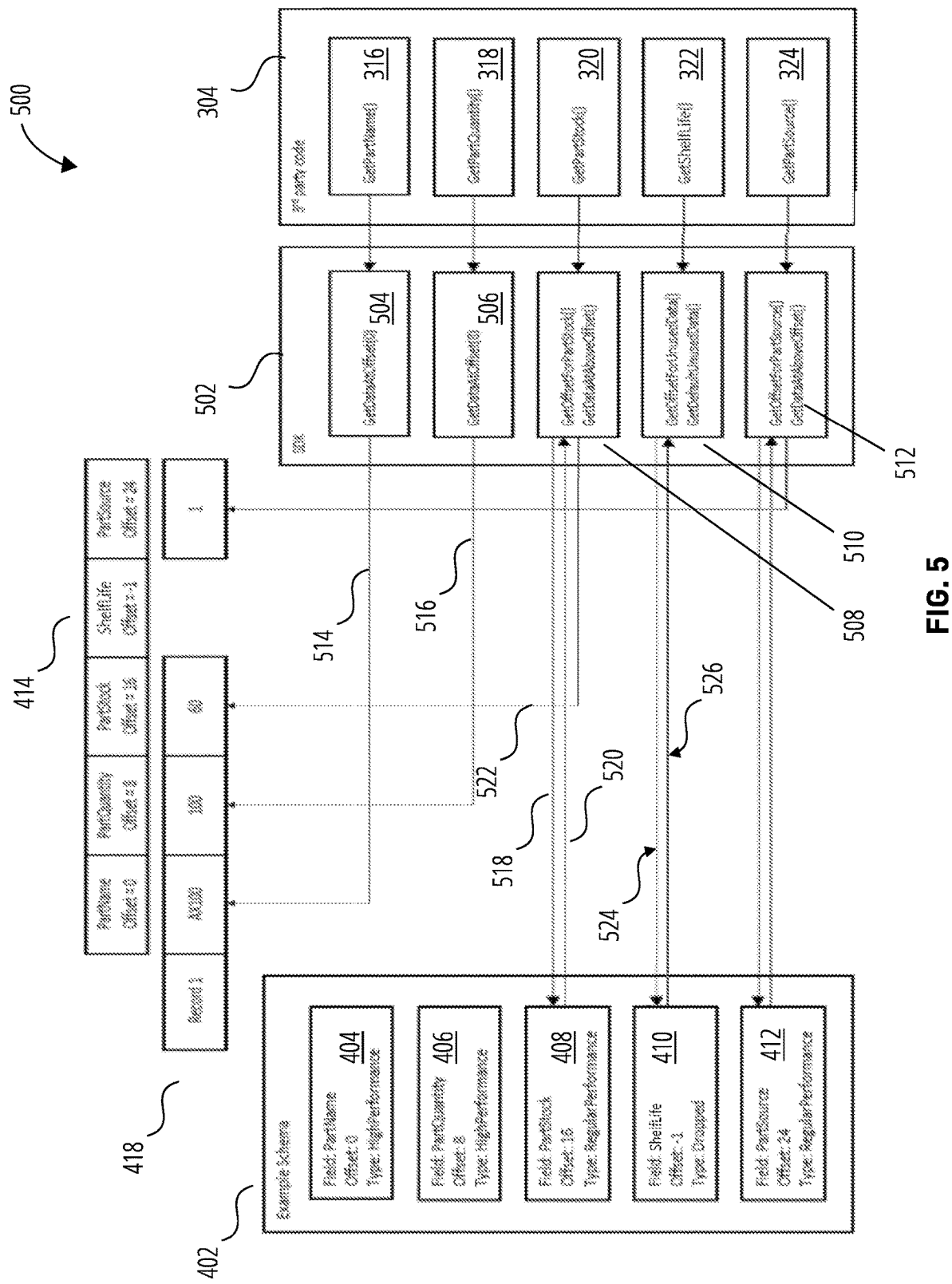
FIG. 5 illustrates a resolution of fields in Record 1 of the example shown in FIG. 3.

FIG. 5 illustrates a resolutions of fields 500 in Record 1 418 of the example shown in FIG. 4.

In FIG. 5, the example schema layout 402 not only provides an offset for a given field, but also classifies each field as one of three types: high performance, regular performance and dropped. This has ramifications for the generated code 502 since the Third-Party Code 304 remains unchanged.

For each high performance field, there is only one corresponding get command in generated code 502; namely, to get the corresponding data at an offset designated for the respective field. This step is retrieval of data from memory. As an example, in FIG. 5, when Third-Party Code 304 requests a Part Name (at 316), the generated code 502 executes the get command at 504, and gets the corresponding data from Record 1 418 at offset '0' (see 514), which is the value 'AX100'. The generated code 502 does not call on the example schema layout 402. Similarly, when Third-Party Code 304 requests a Part Quantity (at 318), the generated code 502 executes the get command at 506, and gets the corresponding data from Record 1 418 at offset '8' (see 516), which is the value '100'. The generated code 502 does not call on the example schema layout 402.

The regular performance field and the dropped field each have two get calls: a first get call to the schema layout to get an offset and subsequent get call to data in the record at the offset returned by the schema layout.

As an example of a regular performance field in FIG. 5, when Third-Party Code 304 requests a Part Stock (at 320), the get command for the offset (at 508) is executed (see 518) by generated code 502; the offset value of 16 is returned (see 520) by the example schema layout 402 to the generated code 502. The generated code 502 then executes the second get command at 508, and gets the corresponding data from Record 1 418 at offset '16' (see 522), which is the value '60'.

Similarly, when Third-Party Code 304 requests a Part Source (at 324), the generated code 502 gets the corresponding offset (at 512) from the example schema layout 402 at 412, which is an offset of 24. The generated code 502 then gets the corresponding data from Record 1 418 at offset '24' (at 512), which is the value '1'.

As an example of a dropped field in FIG. 5, when Third-Party Code 304 requests a Shelf Life (at 322), the get command for the offset (at 510) is executed (see 524) by generated code 502; which is an offset of −1 (that is, an invalid offset). The example schema layout 402 returns the invalid offset to generated code 502 (see 526). In response to the get command to retrieve data at the invalid offset, the system obtains a value for the field data from a source other than the record. For example, the SDK may interrogate the data server for a default value of the field. Another example can be the SDK reaching out to a different system and obtaining a value from that system. Unlike the regular performance field, there is no retrieval of data from the record.

FIG. 6 illustrates field types 600 in accordance with one embodiment.

The schema specifies each field as one of three types: high performance field 602, regular performance field 604 and dropped field 606.

A high performance field 602 has zero get calls; instead it is related to a direct memory operation for retrieval of data in the record at a specified offset. Each of the regular performance field 604 and the dropped field 606 have one or more get calls—that is, a series of function calls. In the embodiment shown in FIG. 6, two examples of get calls are shown: a first get call to the schema to get an offset and subsequent get call to get the data in the record at the offset returned by the schema. The regular performance field 604 and the 606 differ in the execution of the call to get data from the record at the retrieved offset. The regular performance field 604 and the dropped field 606 differ in the execution of the subsequent call to get data from a predetermined method. As an example, this can include returning a default value for the dropped field 606.

An example of a high-performance high performance field 602 is shown in FIG. 5. Third-Party Code 304 requests a Part Name (at 316), after which the generated code 502 directly accesses the corresponding data from Record 1 418 at offset '0' (at 504), which is the value 'AX100'. The generated code 502 does not call on the example schema layout 402.

An example of a regular performance field 604 is shown in FIG. 5. Third-Party Code 304 requests a Part Stock (at 320), after which the generated code 502 gets the corresponding offset (at 508) from the example schema layout 402 at 408, which is an offset of 16 (that is, a valid offset). The generated code 502 then directly accesses the corresponding data from Record 1 418 at offset '16' (at 506), which is the value '60'.

An example of a dropped field 606 is shown in FIG. 5. Third-Party Code 304 requests a Shelf Life (at 322), after which the generated code 502 gets the corresponding offset (at 510) from the example schema layout 402 at 410, which is an offset of −1 (that is, an invalid offset). The example schema layout 402 returns the invalid offset to generated code 502, which results in the SDK to retrieving a value of the dropped field from a source other than Record 1 418. For example, the SDK may interrogate the data server for a default value of the field. Another example can be the SDK reaching out to a different system and obtaining a value from that system.

There are advantages and drawbacks to each type of field.

A high performance field 602 has an advantage of having maximum performance in terms of computer speed, in that the generated code only has one 'get' or call; the get is directly accessing the data in the record and retrieval thereof, and does not involve the schema layout. A get call to look up data in memory takes less time than a get call to obtain information from the schema layout followed by looking up data in memory. However, a drawback of a high performance field 602 is that it has maximum memory usage; a high performance field can always be accessed, or called on, by the generated code.

A regular performance field 604 has good performance, in that its performance level is less than that of high performance field 602. That is because, for a regular performance field 604, the SDK has two 'gets' or calls, rather than one for the high performance field 602: one get call is calling the example schema layouts 102 to obtain the offset of the (regular performance) field, and a second get call is a direct memory access to obtain the data at that offset.

Compared to a high performance field 602, a regular performance field 604 is a little slower in that the generated code has to make two get calls (for the regular performance field 604) as opposed to one get call (for the high performance field 602). On the other hand, an advantage of a regular performance field 604 is that it has the potential for memory savings. While both the high performance field 602 and the regular performance field 604 take up memory, there is an option to change the regular performance field 604 to a dropped field 606 at run time, whereas the high performance field 602 does not have such an option. The regular performance field 604 offers additional memory savings since data changes over time.

A dropped field 606 has a performance level that is less than that of high performance field 602. For dropped field 606, the generated code has two 'gets' or calls, rather than one for the high performance field 602. For dropped field 606, one get is a call to the example schema layout 402 to obtain the offset of the (dropped) field, and a second get is to obtain the data at that offset. However, since the offset is invalid, the system retrieves a value of the dropped field 606 from a source other than the record. The dropped field 606 has an advantage over both the high performance field 602 and the regular performance field 604 in that it has low memory usage.

A high performance field 602 can never be dropped since it is statically chosen at compile time. Furthermore, a regular performance field 604 can become a dropped field 606 at run time, and a dropped field 606 can become a regular performance field 604 at run time, due to changes in the data over time. Therefore, an advantage of a regular performance field 604 is that it has the potential for memory savings, as well as a potential for performance improvements.

There can be an overall performance improvement with the presence of regular performance field 604 and dropped field 606. With the presence of dropped fields 606, a record is reduced in size (in the example of FIG. 5, Record 1 418 is reduce from 40 bytes to 32 bytes due to the dropping of the field "Shelf Life"). This implies that more records can fit into a cache line of a CPU, thereby allowing for faster processing. There may be large performance benefits due to reduction in size of records at runtime.

As an example of increased performance (that is, computer speed and efficiency) is a situation where an algorithm looks at the high performance fields only. While this algorithm is high performance at the outset, the records used by the algorithm are smaller in size, which can result in an improvement in performance of this high performance algorithm.

Figure 7:
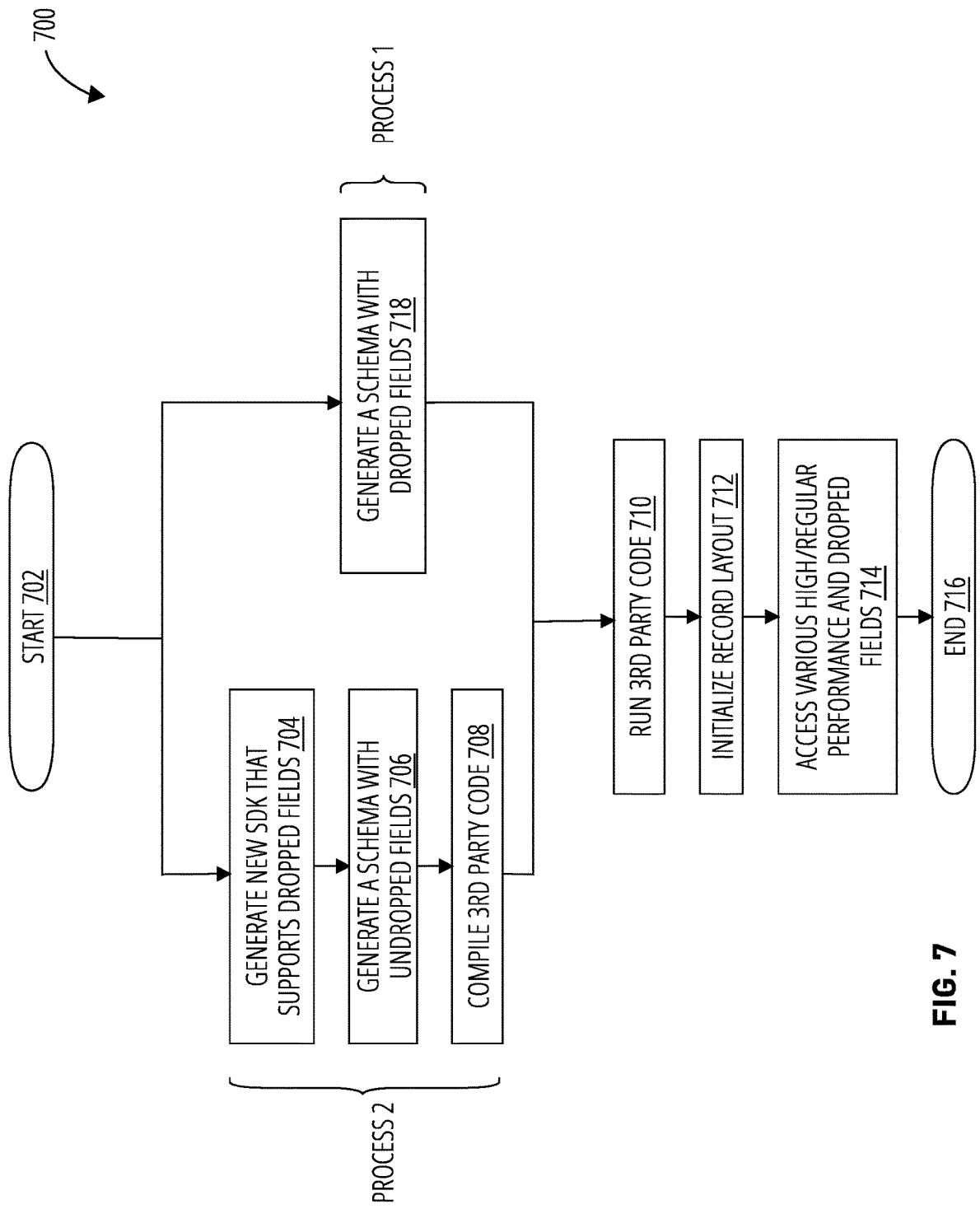
FIG. 7 is a block diagram for improving memory footprint by using droppable fields in accordance with one embodiment.

FIG. 7 is a block diagram 700 for improving memory footprint by using droppable fields in accordance with one embodiment.

Figure 9:
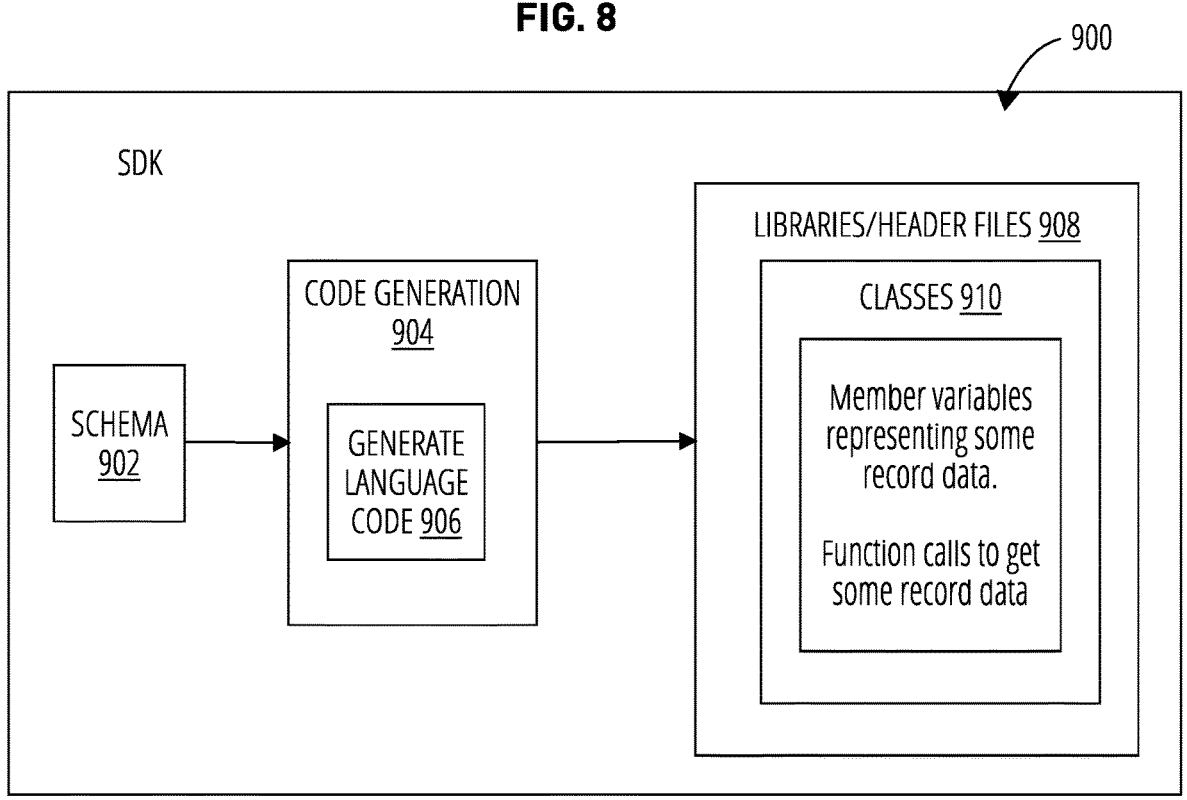
FIG. 9 illustrates generation of a software development kit (SDK) in relation to FIG. 5 in one embodiment.
Figure 10:
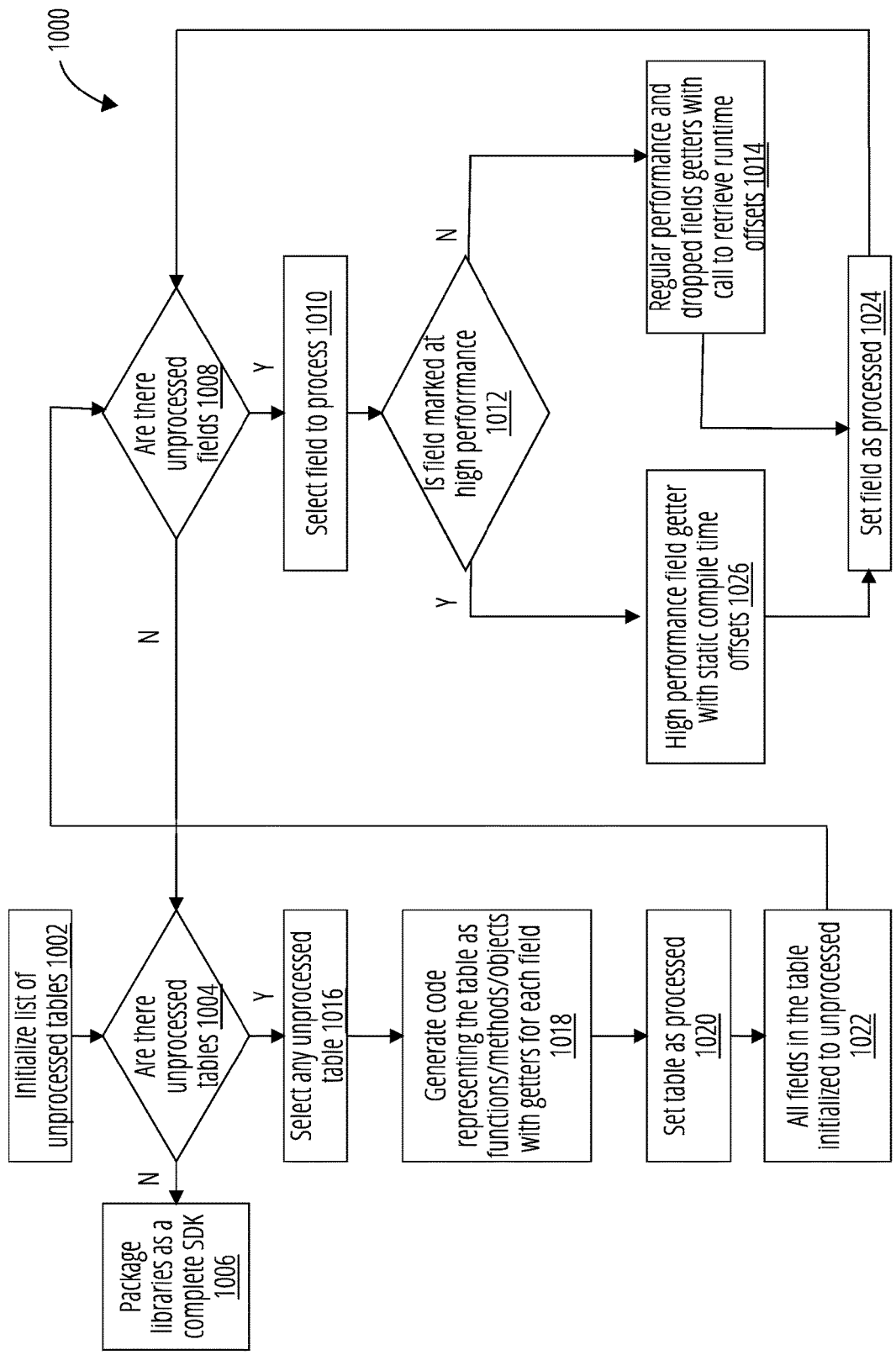
FIG. 10 illustrates a block diagram for generating code generation logic that exposes in memory records to other processes, in accordance with one embodiment.

In FIG. 7, two processes can run in parallel prior to running a third-party code (block 710). A first process (Process 1) generates a schema with dropped fields at block 718; the schema can be in any suitable format. In one embodiment, the format is XML. A second parallel process (Process 2) generates a new SDK that supports dropped fields at block 704. An example of a block diagram for generation of a new SDK is shown in FIG. 10. Following generation of a new SDK, is generation of a schema with undropped fields, at block 706; the schema can be in any suitable format. In one embodiment, the format is XML. A third-party code is then compiled at 708. An example of a block diagram for compilation of a third-party code is shown in FIG. 9.

Figure 11:
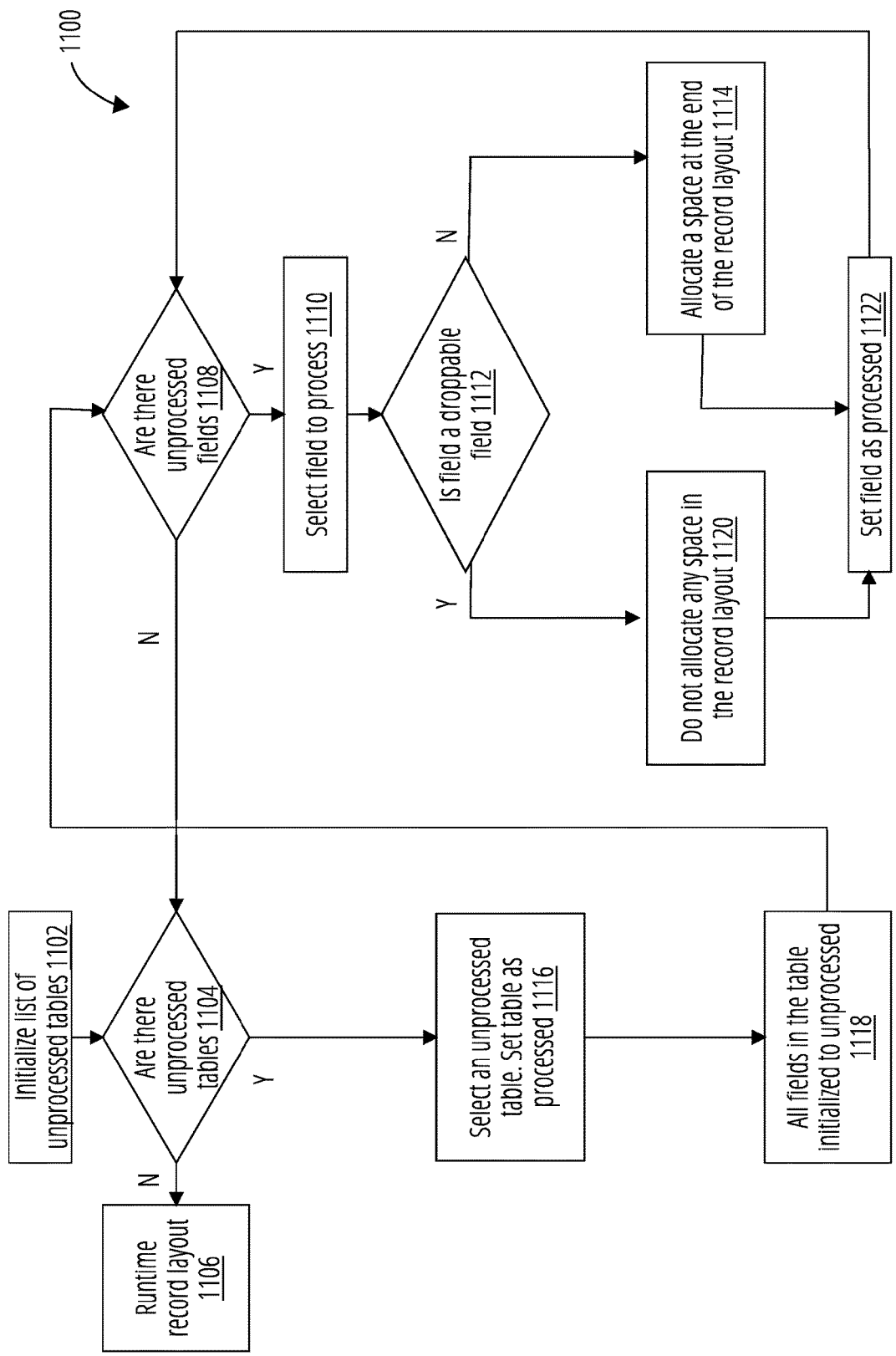
FIG. 11 illustrates a block diagram for a process for initializing record layout, in accordance with one embodiment.
Figure 12:
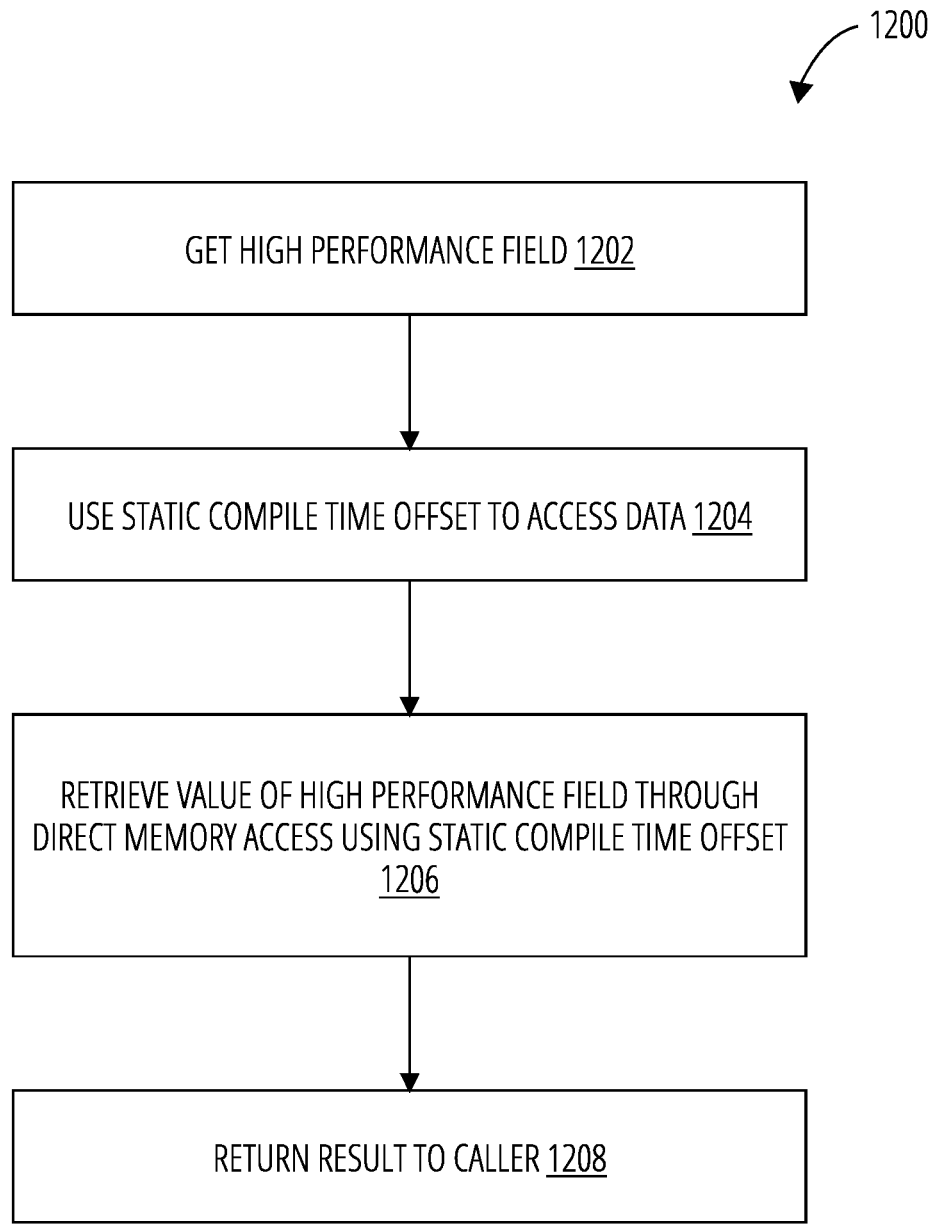
FIG. 12 illustrates a block diagram for a process for resolving a high-performance field on a record, in accordance with one embodiment.
Figure 13:
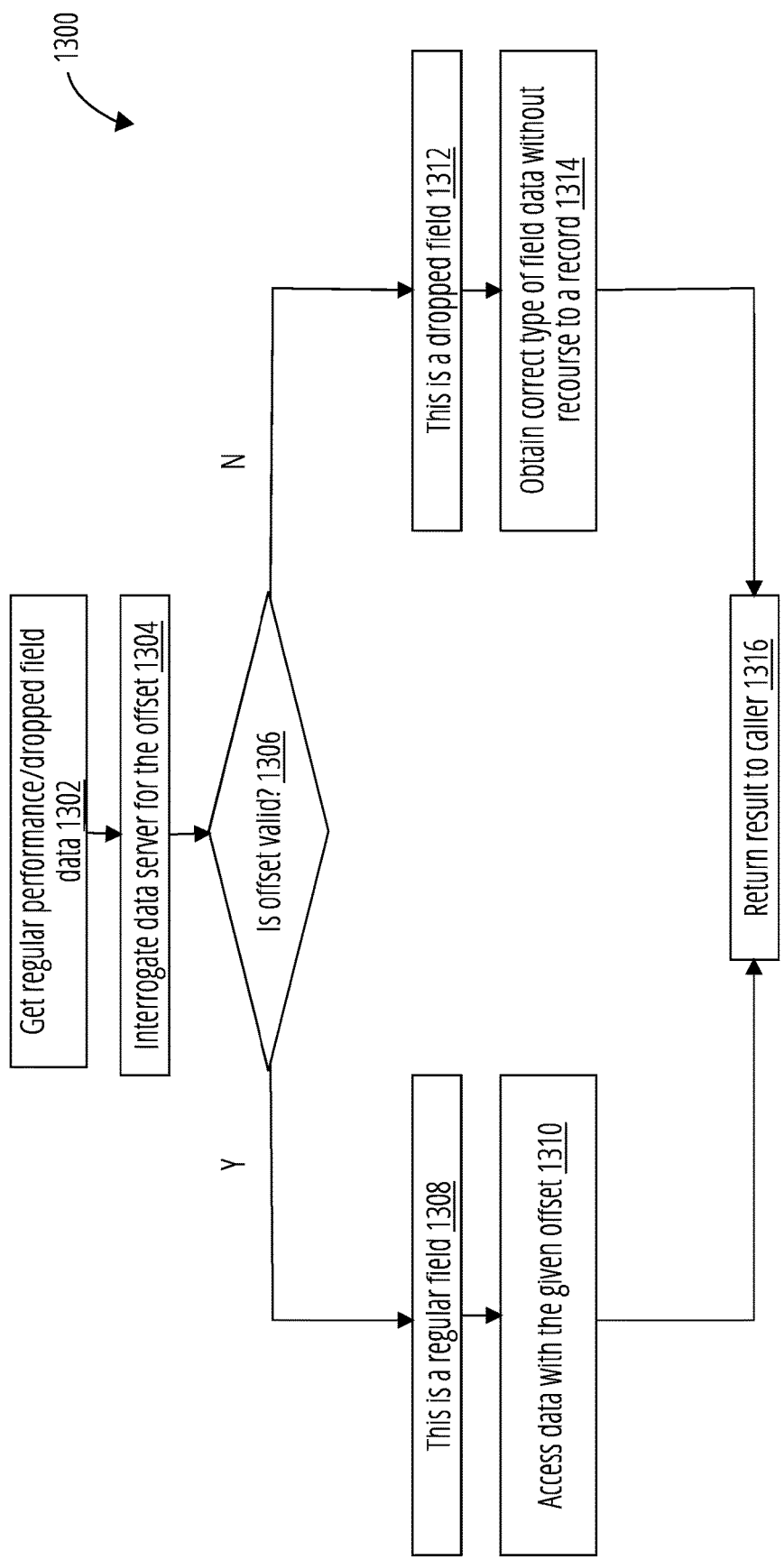
FIG. 13 a block diagram for a process for resolving a regular-performance field or a dropped field on a record in accordance with one embodiment.

Following completion of each of Process 1 and Process 2, the third-party code is executed at block 710. A record layout is initialized at block 712. An example of a block diagram for initialization of a record layout is shown in FIG. 11. Various high performance, regular performance and dropped fields are accessed at block 714. An example of a block diagram for accessing a high performance field is shown in FIG. 12. An example of a block diagram for accessing a regular performance field or a dropped field is shown in FIG. 13. The entire process ends at 716.

Figure 8:
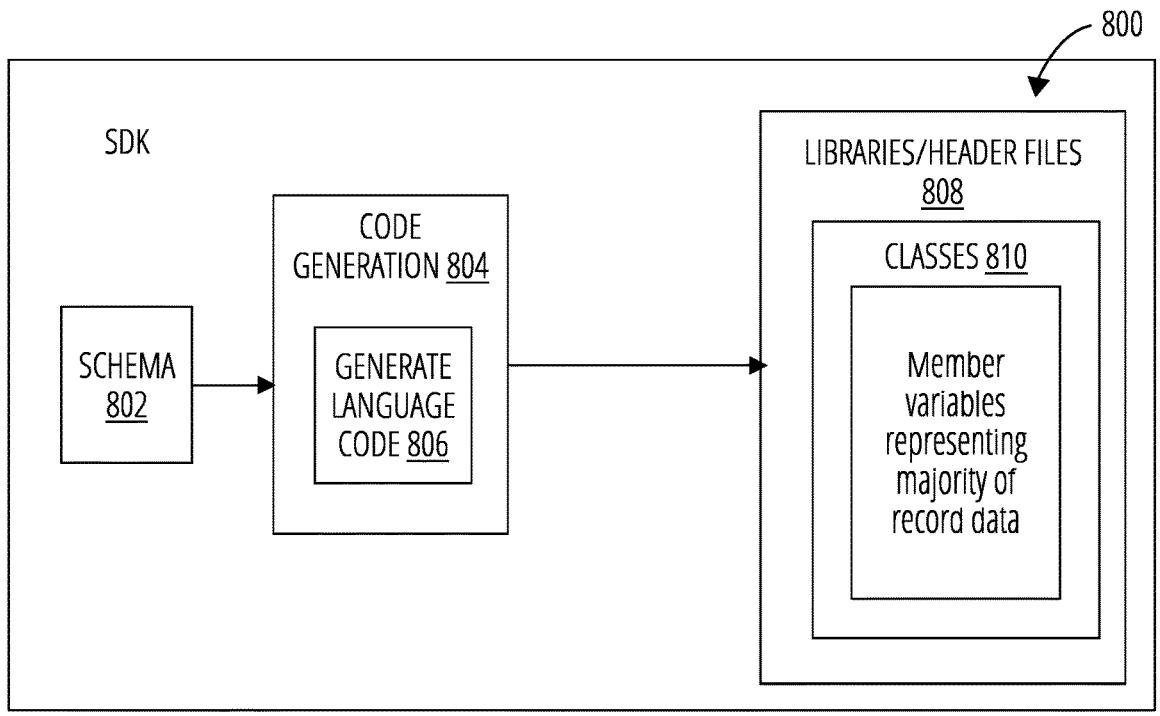
FIG. 8 illustrates generation of a software development kit (SDK) in relation to FIG. 3 in one embodiment.

FIG. 8 illustrates generation of an SDK 800 in relation to FIG. 3 in one embodiment.

Schema 802 directs the code generation at 804; the schema can be in any suitable format. In one embodiment, the format is XML. A language code is generated at 806; the language can be C++, Java, Python, and other languages known in the art.

The SDK 800 can include libraries that are used by the third-party to generate its initial boilerplate code. Code Generation 804 outputs Libraries/Header Files 808, which can include classes/structures/objects. The classes/structures/objects are generated in the language specified at 806; for example, in FIG. 8, C++ classes can be generated at 804 if a C++ code is generated. The generation of classes/structures/objects may contain member variables that can be used to query record data. Member variables may represent the majority of record data.

The SDK 800 is generated either before, or during, the compilation of the third-party code. As such, SDK generation is considered 'compile time'. 'Run time' is considered to occur when the third-party is running its code.

FIG. 9 illustrates generation of an SDK 900 in relation to FIG. 5 in one embodiment.

Schema 902 directs the code generation at 904; the schema can be in any suitable format. In one embodiment, the format is XML. A language code is generated at 806; the language can be C++, Java, Python, and other languages known in the art.

The SDK 900 can include libraries that are used by the third-party to generate its initial boilerplate code. Code Generation 904 outputs Libraries/Header Files 908, which can include classes/structures/objects. The classes/structures/objects are generated in the language specified at 906; for example, in FIG. 9, C++ classes can be generated at 904 if a C++ code is generated. The generation of classes/structures/objects may contain member variables that can be used to query record data.

In contrast to FIG. 8, member variables may represent some of the record data, while function calls are generated to get some of the record data.

FIG. 10 illustrates a block diagram 1000 for generating code generation logic 904 that exposes in memory records to other processes, in accordance with one embodiment. In FIG. 10, generation of the code generation logic is part of compile time.

A list of unprocessed tables is initialized at block 1002, and the sequence of processing unprocessed tables begins at decision block 1004. Once an unprocessed table is selected at block 1016, a code is generated that represents the table as functions/methods/objects with declarations of getters for each field of the table, at block 1018. The table is then set as processed at block 1020. All of the fields in the table are initialized to unprocessed at block 1022 and the sequence to process the fields begins at decision block 1008. A field is selected at block 1010, and checked at decision block 1012 to see if the field is a high performance field. If the field is a high performance field, then the SDK includes high performance fields getters with a static compile time offset of the field, at block 1026. If the field is not a high performance field, then the SDK includes regular performance and dropped field getters with a call to retrieve a runtime offset of the field, at block 1014. The field is then set as processed at block 1024, and the next field is processed in a similar manner at decision block 1008. Once all of the fields are processed ('no' at decision block 1008), the next table is processed in the same manner as the first table, until all of the tables are processed ('no' at decision block 1004). The process ends at block 1006 where the libraries are packaged as a complete SDK.

FIG. 11 illustrates a block diagram 1100 for a process for initializing a record layout at runtime, in accordance with one embodiment.

A list of unprocessed tables is initialized at block 1102, and the sequence of processing unprocessed tables begins at decision block 1104. Once an unprocessed table is selected at block 1116, the table is then set as processed at block 1116. All fields in the table are initialized to unprocessed at block 1118 and the sequence to process the fields begins at decision block 1108. A field is selected for processing at block 1110, and checked at decision block 1112 to see if the field is droppable. If the field is droppable ('yes' at decision block 1112), there is no space allocated in the record layout block 1120. If the field is not droppable ('no' at decision block 1112), space is allocated at the end of the record layout at block 1114. In either case, the field is marked as processed at block 1122. The next field is processed in a similar manner, beginning at decision block 1108. Once all of the fields are processed ('no' at decision block 1108), the next table is processed in the same manner as the first table, until all of the tables are processed ('no' at decision block 1104). The process ends at block 1106 with completion of the runtime record layout.

FIG. 12 illustrates a block diagram 1200 for a process for resolving a high-performance field on a record at runtime, in accordance with one embodiment.

The first step is to call the getter of the high performance field at block 1202. The offset used to access the high performance field data is the static compile time offset, at block 1204. The value of the high performance field is retrieved through a direct memory access using the static compile time offset, at block 1206, which is then returned to the caller at 1208.

An example of this process is shown in FIG. 5 at items 504 and 506. Each of these are with reference to a high performance field (Part Name and Part Quantity, respectively). Generated code 502 includes a get call for each of the high performance fields, with the respective static compile time offset. Thus item 504 includes the call "GetDataOffset(0)", to indicate the Part Name should be retrieved from Record 1 418 at offset '0', as indicated by arrow 514. Similarly, item 506 includes the call "GetDataOffset(8)", to indicate the Part Quantity should be retrieved from Record 1 418 at offset '8', as indicated by arrow 516. Each respective value is returned to the caller: 'AX100' is returned to PartName, while '100' is returned to PartQuantity.

FIG. 13 illustrates a block diagram 1300 for a process for resolving a regular-performance field or a dropped field on a record at runtime in accordance with one embodiment.

The first step is to call the getter of a non-high performance field data at block 1302; that is, either regular performance field data, or a dropped field data. The data server is interrogated for the offset of the field at block 1304. The offset is then checked for validity at decision block 1306. For example, the validity condition can be "is offset>0?", if invalid offsets have been set to a negative value. If the offset is valid, this is indicative of a regular performance field (block 1308), and the getter is accessing of data with the given offset at block 1310.

On the other hand, if the offset is identified as invalid, this indicates that the field is a dropped field (block 1312), and the getter is obtaining a correct type for the field data that is used by the 3rd-party code, without accessing the record, at block 1314. For example, the getter can include interrogation of the data server for a default value of the field. Another example can be the SDK reaching out to a different system and obtaining a value from that system.

After either block 1310 or block 1314, field data is returned to the caller at block 1316.

An example of this process is shown in FIG. 5 at items 508 and 510. Each of these are with reference to either a regular performance field (Part Stock) or a dropped field (Shelf Life). Generated code 502 includes a get call to interrogate for the offset of the field at each of item 508 and item 510.

In the case of Part Stock (item 508), the caller interrogates (arrow 518) the example schema layout 402 item 408, and retrieves the offset value '16' (arrow 520). The validity condition can be "is the offset>0?". In this case, the retrieved offset value is valid, which signals to the caller that the field is a regular performance field. The field data is then accessed (arrow 522) and retrieved from Record 1 418 as '60'.

In the case of Shelf Life (item 510), the caller interrogates (arrow 524) the example schema layout 402 item 410, and retrieves the offset value '-1' (arrow 526). The validity condition can be "is the offset>0?". In this case, the retrieved offset value is invalid, which signals to the caller that the field is a dropped field. The field data is not accessed from Record 1 418, but instead, a value of the field data is retrieved from a source other than Record 1 418. For example, the SDK may interrogate the data server for a default value of the field. Another example can be the SDK reaching out to a different system and obtaining a value from that system.

Figure 14:
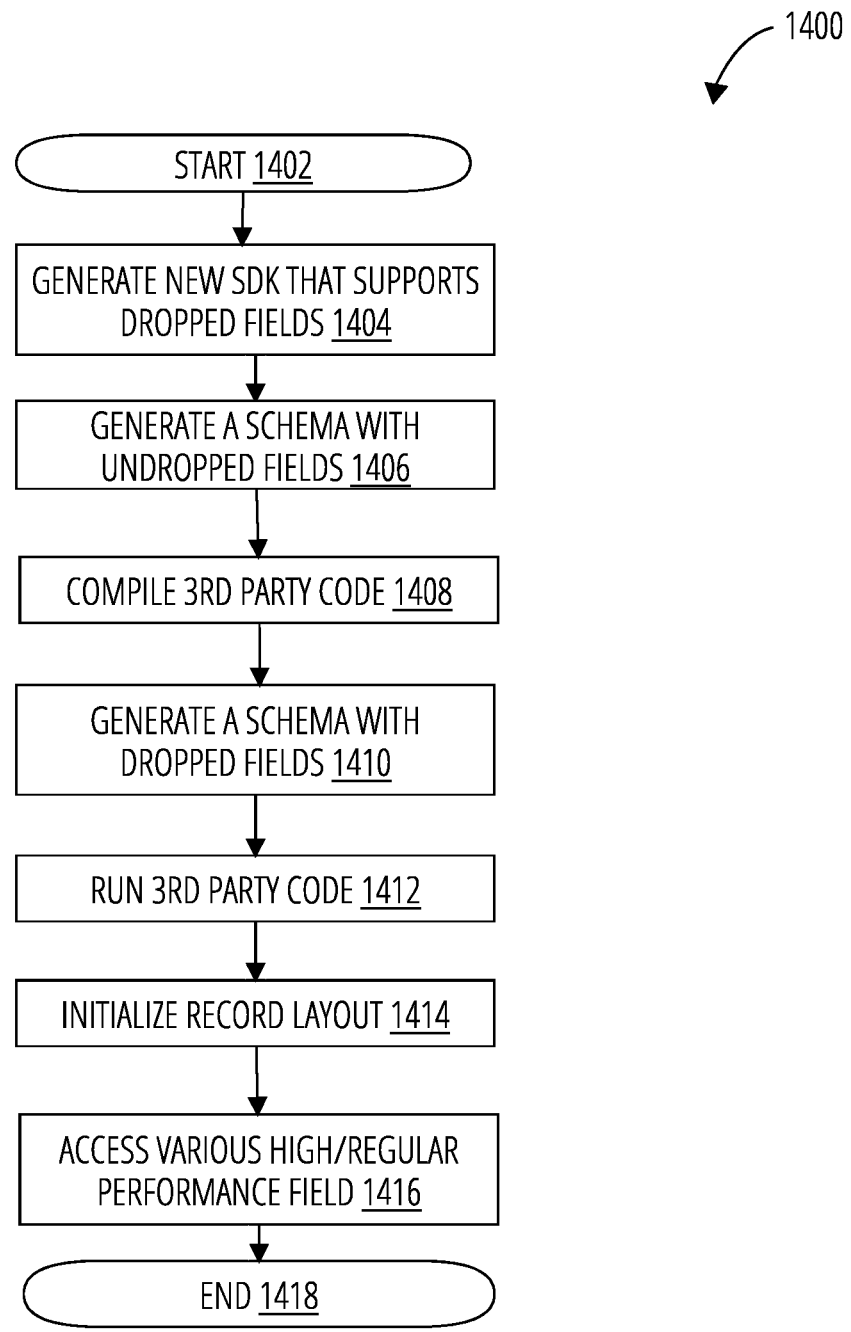
FIG. 14 is a block diagram for improving memory footprint by using droppable fields in accordance with one embodiment.

FIG. 14 is a block diagram 1400 for improving memory footprint by using droppable fields in accordance with one embodiment. Unlike FIG. 7, the process for generating a schema with dropped fields is sequential to the Process 2 of FIG. 7.

In FIG. 14, a new SDK that supports dropped fields is generated at block 1404. An example of a block diagram for generation of a new SDK is shown in FIG. 10. Following generation of a new SDK, is generation of a schema with undropped fields, at block 1406; the schema can be in any suitable format. In one embodiment, the format is XML. A third-party code is then compiled at block 1408 using an SDK. An example of a block diagram for generating an SDK is shown in FIG. 9. Next, a schema with dropped fields is generated at block 1410; the schema can be in any suitable format. In one embodiment, the format is XML. The third-party code is executed at block 1412. A record layout is initialized at block 1414. An example of a block diagram for initialization of a record layout is shown in FIG. 11. Various high performance, regular performance and dropped fields are accessed at block 1416. An example of a block diagram for accessing a high performance field is shown in FIG. 12. An example of a block diagram for accessing a regular performance field or a dropped field is shown in FIG. 13. The entire process ends at done block 1418.

Figure 15:
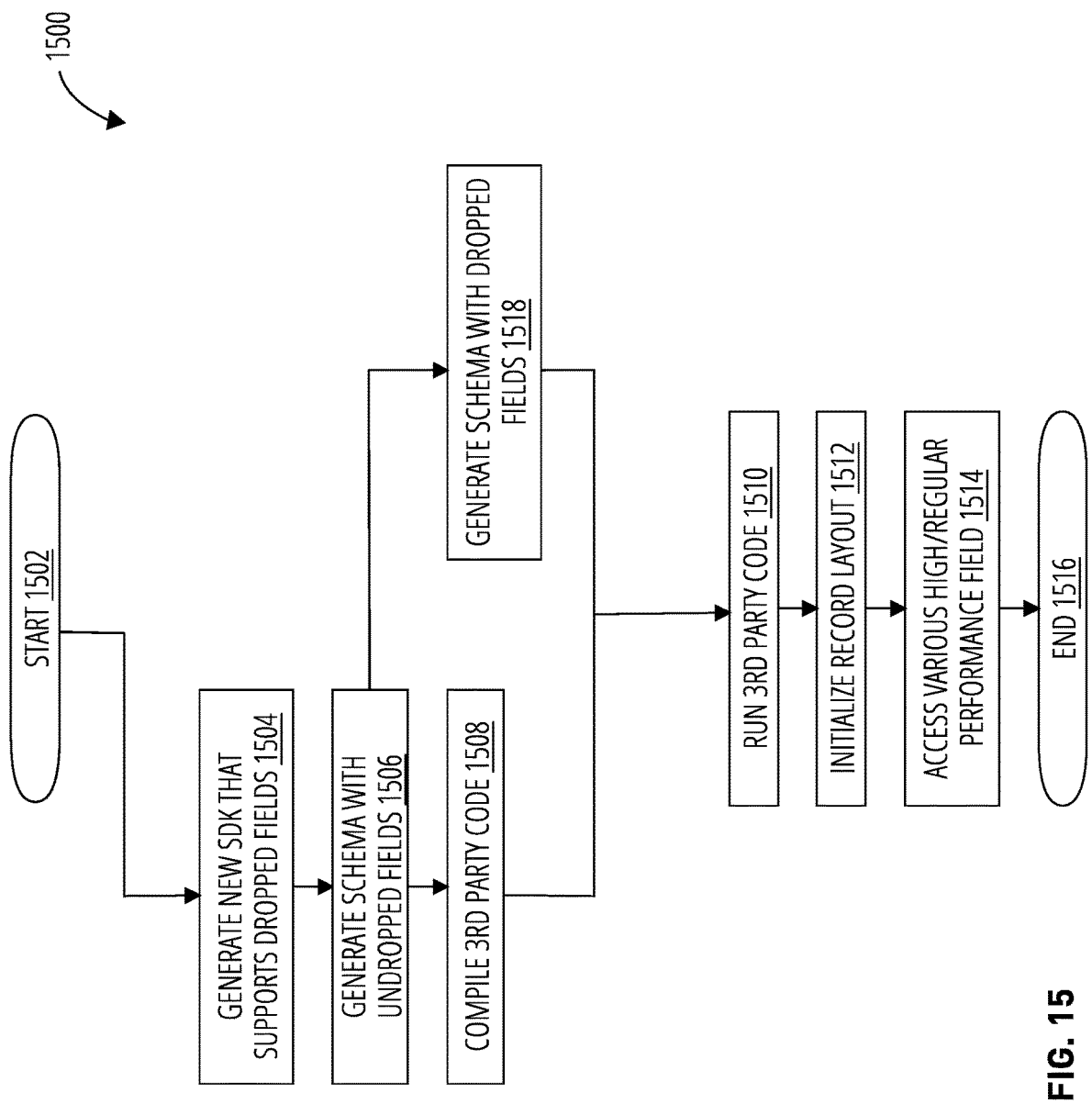
FIG. 15 is a block diagram for improving memory footprint by using droppable fields in accordance with one embodiment.

FIG. 15 is a block diagram 1500 for improving memory footprint by using droppable fields in accordance with one embodiment. Unlike FIG. 7, the process for generating a schema with dropped fields (block 1518) is parallel to compile third-party code (block 1508).

In FIG. 15, a new SDK that supports dropped fields is generated at block 1504. An example of a block diagram for generation of a new SDK is shown in FIG. 10. Following generation of a new SDK, is generation of a schema with undropped fields, at block 1506; the schema can be in any suitable format. In one embodiment, the format is XML. This gives rise to two processes: a third-party code is then compiled at block 1508; and a schema with dropped fields is generated at block 1518 using an SDK; the schema can be in any suitable format. In one embodiment, the format is XML. An example of a block diagram for generating an SDK is shown in FIG. 9.

Following compilation of the third-party code (block 1508) and generation of the schema with dropped fields (block 1518), the third-party code is executed at block 1510. A record layout is initialized at block 1512. An example of a block diagram for initialization of a record layout is shown in FIG. 11. Various high performance, regular performance and dropped fields are accessed at block 1514. An example of a block diagram for accessing a high performance field is shown in FIG. 12. An example of a block diagram for accessing a regular performance field or a dropped field is shown in FIG. 13. The entire process ends at 1516.

Figure 16:
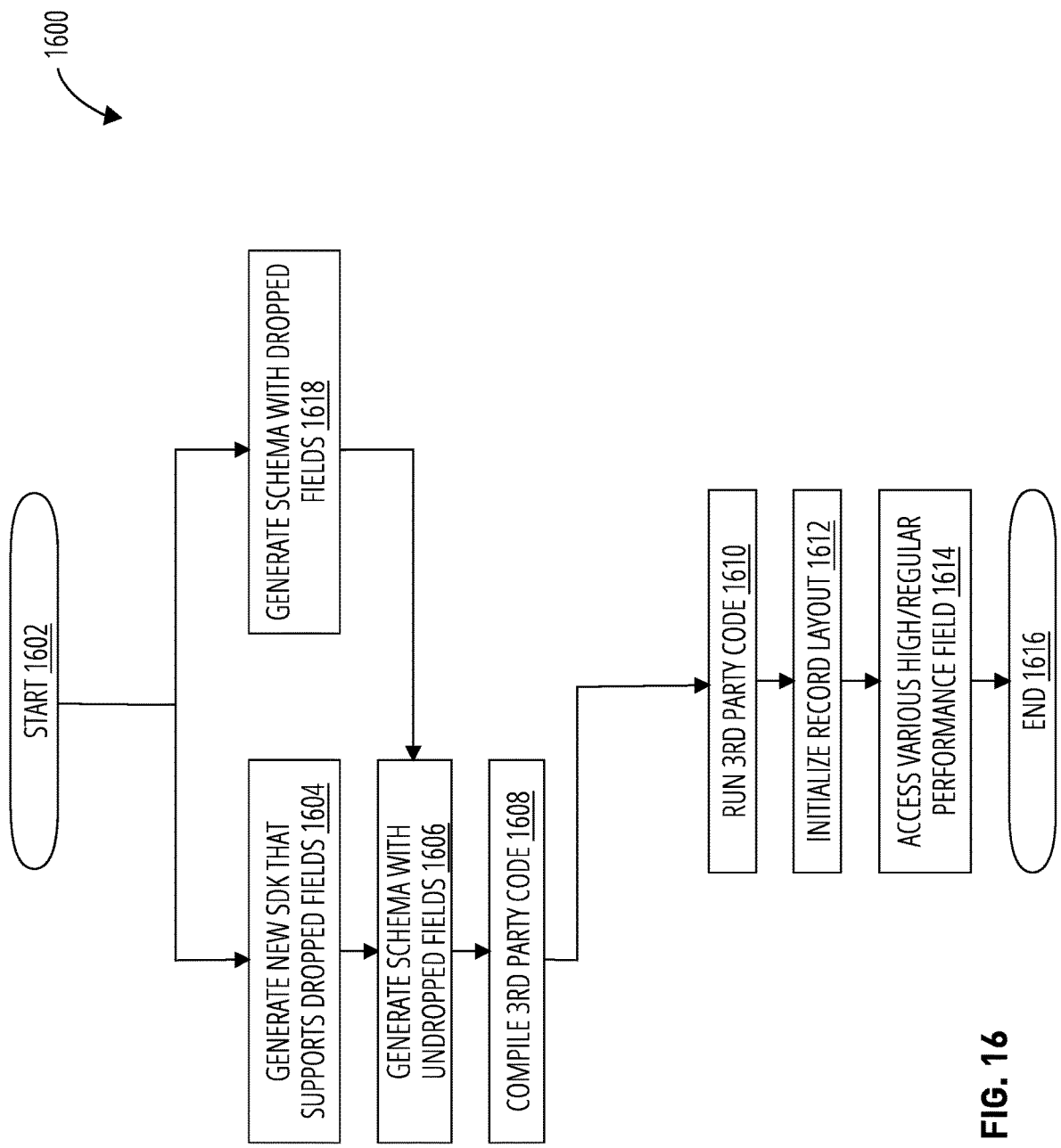
FIG. 16 is a block diagram for improving memory footprint by using droppable fields in accordance with one embodiment.

FIG. 16 is a block diagram for improving memory footprint by using droppable fields in accordance with one embodiment. Unlike FIG. 7, the process for generating a schema with undropped fields occurs after generation of a schema with dropped fields.

In FIG. 16, a new SDK that supports dropped fields is generated at block 1604. An example of a block diagram for generation of a new SDK is shown in FIG. 10. In parallel, a schema with undropped fields is generated at block 1618; the schema can be in any suitable format. In one embodiment, the format is XML. Following generation of the new SDK (block 1604) and generation of the schema with undropped fields (block 1618), is generation of a schema with dropped fields at block 1606; the schema can be in any suitable format. In one embodiment, the format is XML. A third-party code is then compiled at block 1608 using an SDK. An example of a block diagram for generating an SDK is shown in FIG. 9.

Following compilation of the third-party code (block 1608), the third-party code is executed at block 1610. A record layout is initialized at block 1612. An example of a block diagram for initialization of a record layout is shown in FIG. 11. Various high performance, regular performance and dropped fields are accessed at block 1614. An example of a block diagram for accessing a high performance field is shown in FIG. 12. An example of a block diagram for accessing a regular performance field or a dropped field is shown in FIG. 13. The entire process ends at 1616.

Figure 17:
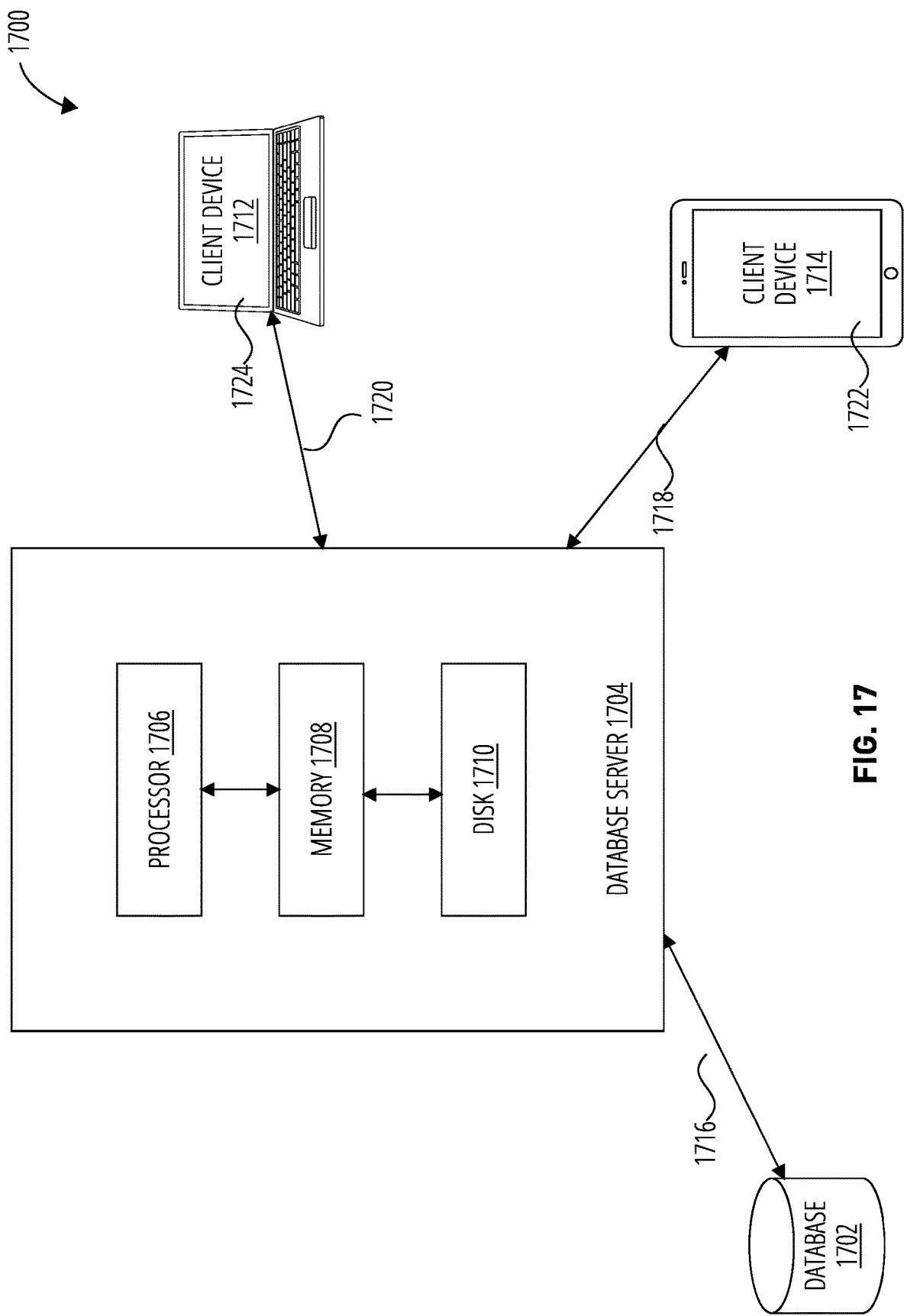
FIG. 17 illustrates an example of a system in accordance with one embodiment.

FIG. 17 illustrates an example of a system 1700 in accordance with one embodiment.

System 1700 includes a database server 1704, a database 1702, and client devices 1712 and 1714. Database server 1704 can include a memory 1708, a disk 1710, and one or more processors 1706. In some embodiments, memory 1708 can be volatile memory, compared with disk 1710 which can be non-volatile memory. In some embodiments, database server 1704 can communicate with database 1702 using interface 1716. Database 1702 can be a versioned database or a database that does not support versioning. While database 1702 is illustrated as separate from database server 1704, database 1702 can also be integrated into database server 1704, either as a separate component within database server 1704, or as part of at least one of memory 1708 and disk 1710. A versioned database can refer to a database which provides numerous complete delta-based copies of an entire database. Each complete database copy represents a version. Versioned databases can be used for numerous purposes, including simulation and collaborative decision-making.

System 1700 can also include additional features and/or functionality. For example, system 100 can also include additional storage (removable and/or non-removable) including, but not limited to, magnetic or optical disks or tape. Such additional storage is illustrated in FIG. 17 by memory 1708 and disk 1710. Storage media can include volatile and nonvolatile, removable and non-removable media implemented in any method or technology for storage of information such as computer-readable instructions, data structures, program modules or other data. Memory 1708 and disk 1710 are examples of non-transitory computer-readable storage media. Non-transitory computer-readable media also includes, but is not limited to, Random Access Memory (RAM), Read-Only Memory (ROM), Electrically Erasable Programmable Read-Only Memory (EEPROM), flash memory and/or other memory technology, Compact Disc Read-Only Memory (CD-ROM), digital versatile discs (DVD), and/or other optical storage, magnetic cassettes, magnetic tape, magnetic disk storage or other magnetic storage devices, and/or any other medium which can be used to store the desired information and which can be accessed by system 1700. Any such non-transitory computer-readable storage media can be part of system 1700.

System 1700 can also include interfaces 1716, 1718 and 1720. Interfaces 1716, 1718 and 1720 can allow components of system 1700 to communicate with each other and with other devices. For example, database server 1704 can communicate with database 1702 using interface 1716. Database server 1704 can also communicate with client devices 1712 and 1714 via interfaces 1720 and 1718, respectively. Client devices 1712 and 1714 can be different types of client devices; for example, client device 1712 can be a desktop or laptop, whereas client device 1714 can be a mobile device such as a smartphone or tablet with a smaller display. Non-limiting example interfaces 1716, 1718 and 1720 can include wired communication links such as a wired network or direct-wired connection, and wireless communication links such as cellular, radio frequency (RF), infrared and/or other wireless communication links. Interfaces 1716, 1718 and 1720 can allow database server 1704 to communicate with client devices 1712 and 1714 over various network types. Non-limiting example network types can include Fibre Channel, small computer system interface (SCSI), Bluetooth, Ethernet, Wi-fi, Infrared Data Association (IrDA), Local area networks (LAN), Wireless Local area networks (WLAN), wide area networks (WAN) such as the Internet, serial, and universal serial bus (USB). The various network types to which interfaces 1716, 1718 and 1720 can connect can run a plurality of network protocols including, but not limited to Transmission Control Protocol (TCP), Internet Protocol (IP), real-time transport protocol (RTP), realtime transport control protocol (RTCP), file transfer protocol (FTP), and hypertext transfer protocol (HTTP).

Using interface 1716, database server 1704 can retrieve data from database 1702. The retrieved data can be saved in disk 1710 or memory 1708. In some cases, database server 1704 can also comprise a web server, and can format resources into a format suitable to be displayed on a web browser. Database server 1704 can then send requested data to client devices 1712 and 1714 via interfaces 1720 and 1718, respectively, to be displayed on applications 1722 and 1724. Applications 1722 and 1724 can be a web browser or other application running on client devices 1712 and 1714.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   executing, by a processor, a first process in parallel with a second process;
   the first process comprising:
     generating, by the processor, a first schema having one or more dropped fields;
   the second process comprising:
     generating, by the processor, a software development kit (SDK) that supports the one or more dropped fields;
     generating, by the processor, a second schema having one or more undropped fields; and
     compiling, by the processor, a third-party code;
   after executing both the first process and the second process:
     running, by the processor, the third-party code;
     initializing, by the processor, a record layout; and
     accessing, by the processor, one or more high performance fields, one or more regular performance fields, and the one or more dropped fields.

2. The computer-implemented method of claim 1, wherein generating the SDK comprises:
   processing, by the processor, one or more tables, the processing the one or more tables comprising:
     selecting, by the processor, a table from the one or more tables;
     generating, by the processor, a code representing the table as one or more functions, methods and/or objects, with one or more getters for each field in the table;
     processing, by the processor, each field in the table, the processing each field comprising:
       assigning, by the processor, a high-performance field getter with a static compile time offset, for a high-performance field; and
       assigning, by the processor, a regular-performance field getter and/or a dropped field getter with a call to retrieve a runtime offset for a regular-performance field;
   and after processing the one or more tables:
     packaging, by the processor, one or more libraries.

3. The computer-implemented method of claim 1, wherein initializing the record layout comprises:
   processing, by the processor, one or more tables, the processing the one or more tables comprising:
     selecting, by the processor, a table from the one or more tables;
     processing, by the processor, each field in the table, the processing each field comprising:
       allocating, by the processor, a space at an end of the record layout for each field that is not droppable;
   and after processing the one or more tables:
     completing, by the processor, the record layout.

4. The computer-implemented method of claim 1, wherein accessing a high performance field comprises:
   calling, by the processor, a getter of the high performance field;
   accessing, by the processor, data associated with the high performance field by using a static compile time offset;
   retrieving, by the processor, a value of the high performance field through a direct memory access using the static compile time offset; and
   returning, by the processor, the value of the high-performance field to a caller that called the getter of the high-performance field.

5. The computer-implemented method of claim 1, wherein accessing a regular performance field comprises:
   calling, by the processor, a getter of data associated with the regular performance field;
   interrogating, by the processor, a data server for an offset of the regular performance field;
   accessing, by the processor, the data by using the offset; and
   returning, by the processor, the data to a caller that called the getter.

6. The computer-implemented method of claim 1, wherein accessing a dropped field comprises:
   calling, by the processor, a getter of data associated with a field that is not a high-performance field;
   interrogating, by the processor, a data server for an offset of the field;
   determining, by the processor, that the offset is invalid, thereby indicating that the field is the dropped field;
   obtaining, by the processor, data for the dropped field suitable for use by the third-party code, without recourse to a record; and
   returning, by the processor, the data suitable for use by the third-party code, to a caller that called the getter.

7. The computer-implemented method of claim 6, wherein data for the dropped field suitable for use by the third-party code is a default value.

8. A computing apparatus comprising:
   a processor; and
   a memory storing instructions that, when executed by the processor, configure the apparatus to:
     execute, by the processor, a first process in parallel with a second process;
     with regards to the first process, the apparatus is configured to:
       generate, by the processor, a first schema having one or more dropped fields;
     with regards to the second process, the apparatus is configured to:
       generate, by the processor, a software development kit (SDK) that supports the one or more dropped fields;
       generate, by the processor, a second schema having one or more undropped fields; and
       compile, by the processor, a third-party code;
     after executing both the first process and the second process, the apparatus is configured to:
       run, by the processor, the third-party code;
       initialize, by the processor, a record layout; and
       access, by the processor, one or more high performance fields, one or more regular performance fields, and the one or more dropped fields.

9. The computing apparatus of claim 8, wherein when generating the SDK, the apparatus is configured to:
process, by the processor, one or more tables;
select, by the processor, a table from the one or more tables;
generate, by the processor, a code representing the table as one or more functions, methods and/or objects, with one or more getters for each field in the table;
process, by the processor, each field in the table;
assign, by the processor, a high-performance field getter with a static compile time offset, for a high-performance field; and
assign, by the processor, a regular-performance field getter and/or a dropped field getter with a call to retrieve a runtime offset for a regular-performance field;
and after processing each field and the one or more tables, package, by the processor, one or more libraries.

10. The computing apparatus of claim 8, wherein when initializing the record layout, the apparatus is configured to:
process, by the processor, one or more tables;
select, by the processor, a table from the one or more tables;
process, by the processor, each field in the table;
allocate, by the processor, a space at an end of the record layout for each field that is not droppable;
and after processing each field and the one or more tables:
complete, by the processor, the record layout.

11. The computing apparatus of claim 8, wherein when accessing a high performance field, the apparatus is configured to:
call, by the processor, a getter of the high performance field;
access, by the processor, data associated with the high performance field by using a static compile time offset;
retrieve, by the processor, a value of the high performance field through a direct memory access using the static compile time offset; and
return, by the processor, the value of the high-performance field to a caller that called the getter of the high-performance field.

12. The computing apparatus of claim 8, wherein when accessing a regular performance field, the apparatus is configured to:
call, by the processor, a getter of data associated with the regular performance field;
interrogate, by the processor, a data server for an offset of the regular performance field;
access, by the processor, the data by using the offset; and
return, by the processor, the data to a caller that called the getter.

13. The computing apparatus of claim 8, wherein when accessing a dropped field, the apparatus is configured to:
call, by the processor, a getter of data associated with a field that is not a high-performance field;
interrogate, by the processor, a data server for an offset of the field;
determine, by the processor, that the offset is invalid, thereby indicating that the field is a dropped field;
obtain, by the processor, data for the dropped field suitable for use by the third-party code, without recourse to a record; and
return, by the processor, the data suitable for use by the third-party code, to a caller that called the getter.

14. The computing apparatus of claim 13, wherein data for the dropped field suitable for use by the third-party code is a default value.

15. A non-transitory computer-readable storage medium, the computer-readable storage medium including instructions that when executed by a computer, cause the computer to:
execute, by the processor, a first process in parallel with a second process;
with regards to the first process, the instructions that when executed by the computer, cause the computer to:
generate, by the processor, a first schema having one or more dropped fields;
with regards to the second process, the instructions that when executed by the computer, cause the computer to:
generate, by the processor, a software development kit (SDK) that supports the one or more dropped fields;
generate, by the processor, a second schema having one or more undropped fields; and
compile, by the processor, a third-party code;
after executing both the first process and second process, the instructions that when executed by the computer, cause the computer to:
run, by the processor, the third-party code;
initialize, by the processor, a record layout; and
access, by the processor, one or more high performance fields, one or more regular performance fields, and the one or more dropped fields.

16. The computer-readable storage medium of claim 15, wherein when generating the SDK, the instructions that when executed by the computer, cause the computer to:
process, by the processor, one or more tables;
select, by the processor, a table from the one or more tables;
generate, by the processor, a code representing the table as one or more functions, methods and/or objects, with one or more getters for each field in the table;
process, by the processor, each field in the table;
when processing each field, the instructions that when executed by the computer, cause the computer to:
assign, by the processor, a high-performance field getter with a static compile time offset, for a high-performance field; and
assign, by the processor, a regular-performance field getter and/or a dropped field getter with a call to retrieve a runtime offset, for a regular-performance field;
and after processing each field and the one or more tables, the instructions that when executed by the computer, cause the computer to:
package, by the processor, one or more libraries.

17. The computer-readable storage medium of claim 15, wherein when initializing the record, the instructions that when executed by the computer, cause the computer to:
process, by the processor, one or more tables;
select, by the processor, a table from the one or more tables;
process, by the processor, each field in the table;
when processing each field, the instructions that when executed by the computer, cause the computer to:
allocate, by the processor, a space at an end of the record layout for each field that is not droppable;
and after processing each and field the one or more tables, the instructions that when executed by the computer, cause the computer to:
complete, by the processor, the record layout.

18. The computer-readable storage medium of claim 15, wherein when accessing a high performance field, the instructions that when executed by the computer, cause the computer to:

call, by the processor, a getter of the high performance field;

access, by the processor, data associated with the high performance field by using a static compile time offset;

retrieve, by the processor, a value of the high performance field through a direct memory access using the static compile time offset; and return, by the processor, the value of the high-performance field to a caller that called the getter of the high-performance field.

19. The computer-readable storage medium of claim 15, wherein when accessing a regular performance field, the instructions that when executed by the computer, cause the computer to:

call, by the processor, a getter of data associated with the regular performance field;

interrogate, by the processor, a data server for an offset of the regular performance field;

access, by the processor, the data by using the offset; and return, by the processor, the data to a caller that called the getter.

20. The computer-readable storage medium of claim 15, wherein when accessing a dropped field, the instructions that when executed by the computer, cause the computer to:

call, by the processor, a getter of data associated with a field that is not a high-performance field;

interrogate, by the processor, a data server for an offset of the field;

determine, by the processor, that the offset is invalid, thereby indicating that the field is a dropped field;

obtain, by the processor, data for the dropped field suitable for use by the third-party code, without recourse to a record; and return, by the processor, the data suitable for use by the third-party code, to a caller that called the getter.

21. The computer-readable storage medium of claim 20, wherein data for the dropped field suitable for use by the third-party code is a default value.

* * * * *